(12) United States Patent
Williams et al.

(10) Patent No.: US 9,958,100 B2
(45) Date of Patent: May 1, 2018

(54) PUSH TO CONNECT CONDUIT FITTING WITH FERRULE

(75) Inventors: Peter C. Williams, Cleveland Heights, OH (US); Daniel G. Trivett, Mayfield Heights, OH (US); Mark A. Clason, Orwell, OH (US); Cal R. Brown, Lyndhurst, OH (US); Douglas S. Welch, Chesterland, OH (US); Ronald Hamilton, Cleveland, OH (US); Douglas J. McClure, Mentor, OH (US); William J. Knaggs, Medina, OH (US); Justin Hamilton, Lakewood, OH (US); Benjamin Chan, Mayfield Heights, OH (US); Gregory S. Kalata, Avon, OH (US)

(73) Assignee: Swagelok Company, Solon, OH (US)

(*) Notice: Subject to any disclaimer, the term of this patent is extended or adjusted under 35 U.S.C. 154(b) by 347 days.

(21) Appl. No.: 13/878,828

(22) PCT Filed: Oct. 14, 2011

(86) PCT No.: PCT/US2011/056259
§ 371 (c)(1),
(2), (4) Date: Apr. 11, 2013

(87) PCT Pub. No.: WO2012/051481
PCT Pub. Date: Apr. 19, 2012

(65) Prior Publication Data
US 2013/0207385 A1  Aug. 15, 2013

Related U.S. Application Data

(60) Provisional application No. 61/393,492, filed on Oct. 15, 2010.

(51) Int. Cl.
| F16L 37/26 | (2006.01) |
| F16L 37/088 | (2006.01) |
| F16L 37/092 | (2006.01) |

(52) U.S. Cl.
CPC ............. *F16L 37/26* (2013.01); *F16L 37/088* (2013.01); *F16L 37/092* (2013.01); *F16L 2201/10* (2013.01); *Y10T 29/4995* (2015.01)

(58) Field of Classification Search
CPC ..... F16L 37/088; F16L 37/092; F16L 37/084; F16L 2201/10; F16L 37/26; Y10T 29/4995

(Continued)

(56) References Cited

U.S. PATENT DOCUMENTS

| 1,337,288 A | 4/1920 | Stichler |
| 2,429,202 A | 10/1947 | Estill |

(Continued)

FOREIGN PATENT DOCUMENTS

| AT | 228575 | 7/1963 |
| CN | 101162068 | 4/2008 |

(Continued)

OTHER PUBLICATIONS

Office action from Chinese Application No. 201180036507.7 dated Jun. 27, 2014 which is a counterpart to U.S. Appl. No. 13/811,918.

(Continued)

*Primary Examiner* — Gregory J Binda
*Assistant Examiner* — Zachary T Dragicevich
(74) *Attorney, Agent, or Firm* — Calfee, Halter & Griswold LLP

(57) ABSTRACT

A push to connect fitting includes a body member adapted to receive a conduit end, a conduit comprising a first end that can be axially inserted into the body member and a conduit gripping device attached to an exterior surface of the con- (Continued)

duit, and a retainer that retains the conduit in place when said conduit is fully inserted into the body member. Additional embodiments include providing a seal with the fitting that seals the exterior surface of the conduit, an optional load retaining sleeve for the conduit gripping device, and an optional gimbal. The push to connect aspect may be realized in the form of a single action unthreaded mechanical connection.

25 Claims, 15 Drawing Sheets

(58) Field of Classification Search
USPC .......................................... 285/307, 308, 321
See application file for complete search history.

(56) References Cited

U.S. PATENT DOCUMENTS

| | | | |
|---|---|---|---|
| 2,561,887 A | 7/1951 | Risley | |
| 2,702,202 A | 2/1955 | Kaiser | |
| 2,848,135 A | 8/1958 | Rickard et al. | |
| 2,914,344 A | 11/1959 | Anthes | |
| 3,398,977 A | 8/1968 | Yoneda | |
| 3,453,005 A | 7/1969 | Foults | |
| 3,773,360 A | 11/1973 | Timbers | |
| 3,887,222 A | 6/1975 | Hammond | |
| 4,055,359 A | 10/1977 | McWethy | |
| 4,105,226 A | 8/1978 | Frey et al. | |
| 4,111,464 A | 9/1978 | Asano et al. | |
| 4,135,745 A | 1/1979 | Dehar | |
| 4,191,408 A | 3/1980 | Acker | |
| 4,193,616 A | 3/1980 | Sarson et al. | |
| 4,240,654 A | 12/1980 | Gladieux | |
| 4,298,220 A | 11/1981 | Kukuminato | |
| 4,304,422 A * | 12/1981 | Schwarz | F16L 19/103 285/341 |
| 4,311,328 A | 1/1982 | Truchet | |
| 4,401,326 A | 8/1983 | Blair | |
| 4,455,177 A | 6/1984 | Filippov et al. | |
| 4,645,245 A | 2/1987 | Cunningham | |
| 4,685,706 A | 8/1987 | Kowal et al. | |
| 4,703,958 A | 11/1987 | Fremy | |
| 4,750,765 A | 6/1988 | Cassidy et al. | |
| 4,752,088 A | 6/1988 | Stahl et al. | |
| 4,793,637 A | 12/1988 | Laipply et al. | |
| 4,813,716 A | 3/1989 | Lalikos et al. | |
| 4,834,423 A | 5/1989 | DeLand | |
| 4,872,710 A | 10/1989 | Konecny et al. | |
| 4,893,810 A | 1/1990 | Lee | |
| 4,906,031 A | 3/1990 | Vyse | |
| 4,923,228 A | 5/1990 | Laipply | |
| 5,005,877 A | 4/1991 | Hayman | |
| 5,022,687 A | 6/1991 | Ariga | |
| 5,024,468 A | 6/1991 | Burge | |
| 5,042,848 A | 8/1991 | Shiozaki | |
| 5,044,401 A | 9/1991 | Giesler et al. | |
| 5,076,541 A | 12/1991 | Daghe et al. | |
| 5,181,751 A | 1/1993 | Kitamura | |
| 5,226,682 A | 7/1993 | Marrison et al. | |
| 5,284,369 A | 2/1994 | Kitamura | |
| 5,301,408 A | 4/1994 | Berman et al. | |
| 5,401,065 A * | 3/1995 | Okumura et al. | 285/328 |
| 5,474,336 A | 12/1995 | Hoff et al. | |
| 5,553,895 A | 9/1996 | Karl et al. | |
| 5,562,371 A | 10/1996 | Reed | |
| 5,566,987 A | 10/1996 | Mazhar | |
| 5,570,910 A | 11/1996 | Highlen | |
| 5,632,651 A | 5/1997 | Szegda | |
| 5,653,480 A | 8/1997 | Mine | |
| 5,681,061 A | 10/1997 | Olson | |
| 5,683,120 A | 11/1997 | Brock | |
| 5,685,575 A | 11/1997 | Allread et al. | |
| 6,073,976 A | 6/2000 | Schmidt et al. | |
| 6,142,496 A | 11/2000 | Kouda | |
| 6,186,557 B1 | 2/2001 | Funk | |
| 6,334,634 B1 | 1/2002 | Osterkil | |
| 6,349,978 B1 | 2/2002 | McFarland | |
| 6,390,511 B1 | 5/2002 | Kargula | |
| 6,447,017 B1 | 9/2002 | Gilbreath et al. | |
| 6,461,551 B1 | 10/2002 | Mandish | |
| 6,464,266 B1 * | 10/2002 | O'Neill et al. | 285/340 |
| 6,517,126 B1 * | 2/2003 | Peterson | |
| 6,604,760 B2 | 8/2003 | Cresswell et al. | |
| 6,629,708 B2 | 10/2003 | Williams et al. | |
| 6,769,720 B2 | 8/2004 | Dahms et al. | |
| 6,964,435 B2 | 11/2005 | Wolf et al. | |
| 6,983,959 B2 | 1/2006 | Wolf et al. | |
| 7,029,035 B2 | 4/2006 | Seymour, II et al. | |
| 7,100,949 B2 | 9/2006 | Williams et al. | |
| 7,140,645 B2 | 11/2006 | Cronley | |
| 7,195,286 B2 | 3/2007 | Hama | |
| 7,208,052 B2 | 4/2007 | Hammond et al. | |
| 7,240,929 B2 | 7/2007 | Williams et al. | |
| 7,264,281 B2 | 9/2007 | Le Quere | |
| 7,273,236 B2 | 9/2007 | Le Quere et al. | |
| 7,367,595 B2 | 5/2008 | Williams et al. | |
| 7,387,318 B2 | 6/2008 | Yoshida | |
| 7,419,012 B2 | 9/2008 | Lynch | |
| 7,488,006 B2 | 2/2009 | Dahms et al. | |
| 7,506,899 B2 | 3/2009 | Feith | |
| 7,516,989 B2 | 4/2009 | Yoshida | |
| 7,543,854 B2 | 6/2009 | Dahms | |
| 7,614,668 B1 | 11/2009 | Williams et al. | |
| 7,699,358 B2 | 4/2010 | Williams et al. | |
| 7,762,595 B2 | 7/2010 | Enderich et al. | |
| 7,806,443 B1 * | 10/2010 | Plattner | F16L 19/103 285/249 |
| 7,850,208 B2 | 12/2010 | Greenberger | |
| 7,914,050 B2 | 3/2011 | Udhofer | |
| 7,922,214 B2 | 4/2011 | Nakamura et al. | |
| 8,240,719 B2 | 8/2012 | Udhofer | |
| 8,555,624 B2 | 10/2013 | Lechner | |
| 9,447,906 B2 | 9/2016 | Bobo | |
| 9,541,228 B2 | 1/2017 | Bobo | |
| 9,611,965 B2 | 4/2017 | Cheon | |
| 2002/0140227 A1 | 10/2002 | Kawakami | |
| 2004/0094957 A1 | 5/2004 | Walmsley et al. | |
| 2006/0220380 A1 * | 10/2006 | Yoshino | F16L 37/0985 285/307 X |
| 2007/0164563 A1 | 7/2007 | Arstein et al. | |
| 2008/0088127 A1 | 4/2008 | Tiberghien | |
| 2008/0136178 A1 | 6/2008 | Udhofer et al. | |
| 2009/0121478 A1 | 5/2009 | Tsujita | |
| 2009/0178733 A1 | 7/2009 | Somers et al. | |
| 2009/0214287 A1 | 8/2009 | Usui et al. | |
| 2010/0171302 A1 | 7/2010 | Yoder | |
| 2011/0227337 A1 | 9/2011 | Kattler | |
| 2013/0119659 A1 | 5/2013 | Williams et al. | |
| 2013/0207385 A1 | 8/2013 | Williams et al. | |
| 2015/0115602 A1 | 4/2015 | Clason | |
| 2015/0240980 A1 | 8/2015 | Bobo et al. | |
| 2015/0263498 A1 | 9/2015 | Thomas | |
| 2015/0345683 A1 | 12/2015 | Crompton | |
| 2016/0126716 A1 | 5/2016 | Crompton | |
| 2016/0161038 A1 | 6/2016 | Crompton | |
| 2016/0273695 A1 | 9/2016 | Bobo | |
| 2016/0312932 A1 | 10/2016 | Williams et al. | |
| 2016/0327196 A1 | 11/2016 | Gledhil | |
| 2017/0082231 A1 | 3/2017 | Crompton | |

FOREIGN PATENT DOCUMENTS

| | | |
|---|---|---|
| CN | 102203491 | 9/2011 |
| DE | 2741512 | 4/1979 |
| DE | 7914106 | 8/1979 |
| DE | 2824943 | 12/1979 |
| DE | 2856069 | 7/1980 |
| DE | 2912160 | 10/1980 |
| DE | 2922869 | 12/1980 |
| DE | 4243844 | 6/1994 |
| DE | 19517269 | 11/1996 |
| DE | 19837355 | 2/2000 |

(56) References Cited

FOREIGN PATENT DOCUMENTS

| | | |
|---|---|---|
| DE | 19932307 | 1/2001 |
| DE | 10125499 | 8/2002 |
| DE | 102006015555 | 1/2007 |
| DE | 202006018794 | 4/2008 |
| EP | 156575 | 10/1985 |
| EP | 368795 | 5/1990 |
| EP | 373920 | 6/1990 |
| EP | 511436 | 11/1992 |
| EP | 615089 | 9/1994 |
| EP | 676019 | 10/1995 |
| EP | 715111 | 6/1996 |
| EP | 718538 | 6/1996 |
| EP | 735306 | 10/1996 |
| EP | 762036 | 3/1997 |
| EP | 898109 | 2/1999 |
| EP | 1235023 | 8/2002 |
| EP | 2163802 | 3/2010 |
| EP | 2589848 | 5/2013 |
| EP | 2558763 | 3/2016 |
| EP | 2817548 | 3/2016 |
| FR | 2545908 | 11/1984 |
| GB | 2104607 | 3/1983 |
| GB | 2325718 | 12/1998 |
| GB | 2398612 | 8/2004 |
| GB | 2445701 | 7/2008 |
| GB | 2480880 | 12/2011 |
| JP | H022035 | 1/1990 |
| JP | H0320637 | 3/1991 |
| JP | H05312283 | 11/1993 |
| JP | H07190272 | 7/1995 |
| JP | H10510038 | 9/1998 |
| JP | 2003-014169 | 1/2003 |
| JP | 2009-523967 | 6/2009 |
| WO | 97/13994 | 4/1997 |
| WO | 02/29300 | 4/2002 |
| WO | 02/29301 | 4/2002 |
| WO | 07/084183 | 7/2007 |
| WO | 07/117688 | 10/2007 |
| WO | 2012/018576 | 2/2012 |
| WO | 2012/051481 | 4/2012 |
| WO | 13/056273 | 4/2013 |

OTHER PUBLICATIONS

Office action from Chinese application No. 201180049676.4 dated Jul. 28, 2014 which is a counterpart to U.S. Appl. No. 13/878,828.
International Search Report and Written Opinion from PCT/US11/56259 dated Feb. 29, 2012.
International Search Report and Written Opinion from PCT/US11/045145 dated Dec. 23, 2011.
Search Report from European Application No. 11815036.6 dated May 27, 2014.
Search Report from European Application No. 11833454.9 dated Nov. 16, 2015.
Office action from Chinese Application No. 201180049676.4 dated May 26, 2015 which is a counterpart to U.S. Appl. No. 13/878,828.
Office action from Japanese Application No. 2013-534019 dated Aug. 11, 2015.
International Search Report and Written Opinion from PCT/US14/61704 dated Jan. 14, 2015.
Notice of Allowance from U.S. Appl. No. 14/520,616 dated Jun. 5, 2017.
Notice of Allowance from U.S. Appl. No. 14/520,616 dated Feb. 16, 2017.
Office action from U.S. Appl. No. 14/520,616 dated Sep. 28, 2016.
Office action from Chinese Application No. 201480070848.X dated May 17, 2017.
Search Report from European Application No. 14856769.6 dated May 2, 2017.
Speedfit Plastic push-in fittings stop valve, 1 pg., issued Jul. 1997, RS Components.
Quick connect Plumbing Solutions Video web pages, Watts.com, 2 pgs., copyright 2017.
Plumbing Supply.Com, Speedfit Quick Connect Fittings by John Guest, 40 pgs., accessed on Apr. 27, 2017.
Office action from European Application No. 11833454.9 dated Oct. 20, 2017.
Notice of allowance from U.S. Appl. No. 14/520,616 dated Oct. 11, 2017.
International Search Report from PCT/US16/28741 dated Aug. 30, 2016.

* cited by examiner

PUSH TO CONNECT CONDUIT FITTING WITH FERRULE

This application is the U.S. national phase entry of PCT/US2011/56259, with an international filing date of Oct. 14, 2011 which claims the benefit of provisional U.S. patent application Ser. No. 61/393,492 filed on Oct. 15, 2010 for PUSH TO CONNECT CONDUIT FITTING, the entire disclosures of which are fully incorporated herein by reference in their entirety.

TECHNICAL FIELD OF THE DISCLOSURE

The present disclosure relates to fittings or mechanical connections for metal conduits such as metal tube and pipe. More particularly, the disclosure relates to fittings that can be quickly assembled with a push to connect action.

BACKGROUND OF THE DISCLOSURE

Fittings are used in gas or liquid fluid systems to provide a fluid tight mechanical connection between a conduit and another fluid flow device, such as another conduit, a flow control device such as a valve or regulator, a port and so on. A particular type of fitting commonly used is known as a flareless fitting that uses one or more conduit gripping devices such as ferrules, for example, to provide the conduit grip and seal functions. Such fittings are popular as they do not require much preparation of the conduit end, other than squaring off and de-burring. High performance conduit fittings typically involve a threaded connection wherein the fitting is pulled-up or tightened by relative rotation of turns and partial turns between two threaded mating components.

SUMMARY OF THE DISCLOSURE

In accordance with an embodiment of one or more of the inventions presented in this disclosure, conduit fitting concepts are disclosed that facilitate assembly by using a push to connect action or method. In one embodiment, a conduit fitting assembly facilitates a single action push to connect mechanical connection. In exemplary embodiments, the fitting may be realized with a non-threaded mechanical connection. Preferably, although not required, a generally cylindrical conduit end may be inserted into an un-tightened or loosely assembled fitting assembly and retained in place as a final or completed connection. In a particular embodiment, a separate tool may be used to allow the conduit to be removed from the completed assembly without complete separation of the constituent parts, but in an alternative embodiment for the tool, the tool may be integrated with a conduit retention mechanism. In other embodiments, one of the fitting components provides structure by which the conduit may be removed without complete separation of the constituent parts. In the exemplary embodiments, a mechanical connection may be made to a conduit end without requiring any shaping, forming or machining of the conduit other than optionally the usual end facing and deburring. The exemplary embodiments herein also exhibit excellent performance characteristics as to pressure, seal and fatigue resistance from vibrations and stress applied to the conduit. As such, the fitting concepts disclosed herein are well suited for many different applications, including automotive applications, that may endure long periods of vibration and stress on the conduit, but with the fitting being able to seal several thousand pounds per square inch of gas pressure over typical operating temperatures of about −40° F. or lower to about 250° F. or higher.

In still further embodiments, intrinsic gauging features may optionally be provided with the conduit fitting assembly to provide a visual or tactile indication to the assembler whether the fitting assembly is in a loosened or tightened condition.

These and other embodiments of various inventions disclosed herein will be understood by those skilled in the art in view of the accompanying drawings.

DESCRIPTION OF THE EXEMPLARY EMBODIMENTS

Figure 1:
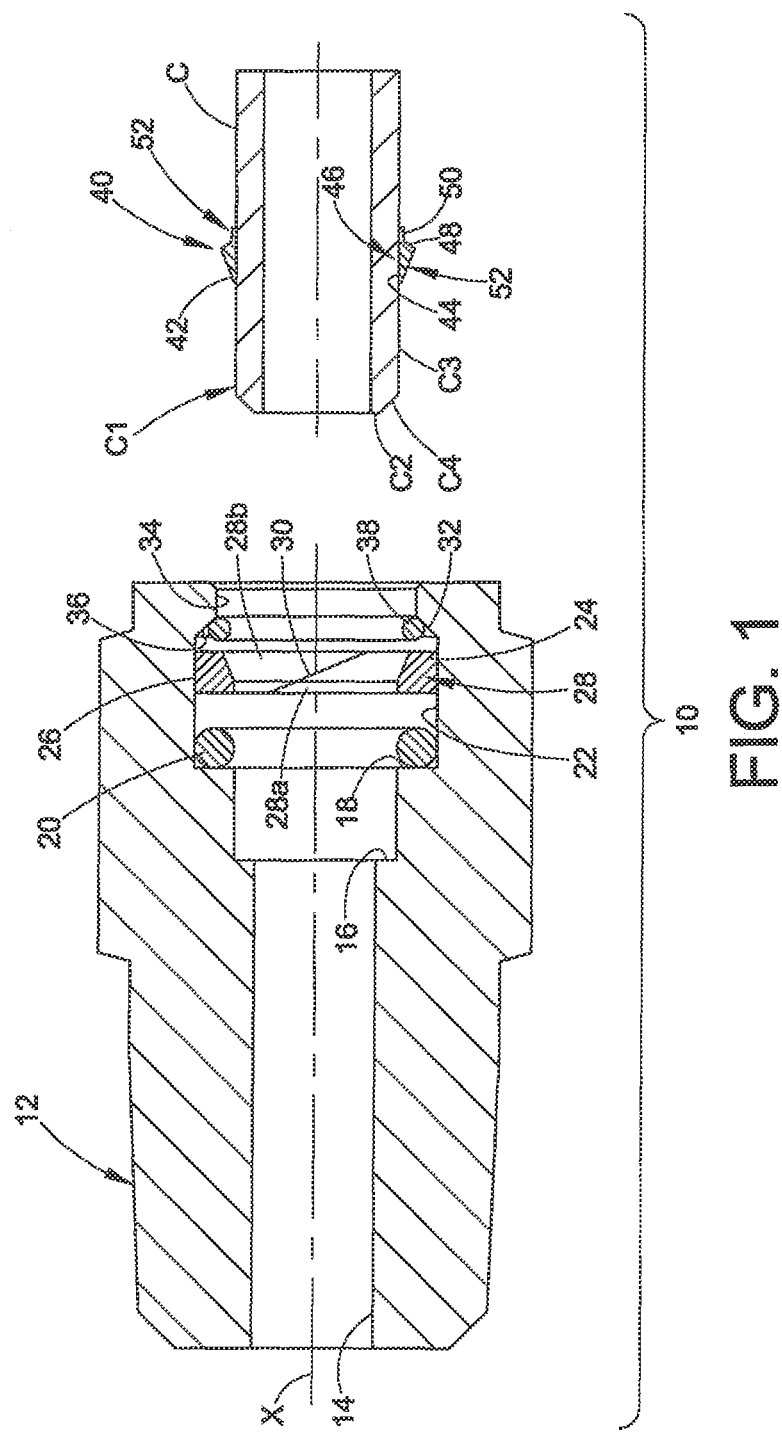
FIG. 1 illustrates in an exploded view a first embodiment of one or more of the inventions herein, in longitudinal cross-section.

Although the exemplary embodiments herein are presented in the context of mechanical connections for rigid conduits, for example a stainless steel tube fitting, the inventions herein are not limited to such applications, and will find use with many different metal conduits such as tube and pipe as well as different materials other than 316 stainless steel, and may also be used for liquid or gas fluids. Although the inventions herein are illustrated with respect to a particular design of the conduit gripping devices and fitting components, the inventions are not limited to use with such designs. The inventions may be used with tube or pipe, so we use the term "conduit" to include tube or pipe or both. We do not intend that the term conduit be limited as to any particular length, use or configuration; for example, a conduit may be a tube stub or other metal jacket or sleeve type component used to provide a fitting connection. We generally use the terms "fitting assembly" and "fitting" interchangeably as a shorthand reference to an assembly of fitting components along with one or more conduit seal and gripping devices. The concept of a "fitting assembly" thus may include an assembly of the parts onto a conduit, either in a loosely assembled or fully assembled tightened position; but the term "fitting assembly" is also intended to include an assembly of parts together without a conduit, for example for shipping or handling, as well as the constituent parts themselves even if not assembled together. We also use the term "fitting remake" and derivative terms herein to refer to a fitting assembly that has been at least once tightened or completely connected, loosened, and then re-assembled to another completely connected position. Remakes may be done with the same fitting assembly parts or may involve the replacement of one of more of the parts of the fitting assembly. Reference herein to "outboard" and "inboard" are for convenience and simply refer to whether a direction is axially towards the connection (inboard) or away from the connection (outboard), referenced to the central longitudinal axis X of the fitting assembly. All references herein to "radial" and "axial" are referenced to the X axis except as may otherwise be noted. Also, all references herein to angles are referenced to the X axis except as may otherwise be noted. We use the term "conduit end" to refer to an end portion of a conduit. By "intrinsic gauge" we mean a structure that provides an indication that pull-up of a fitting is complete, without the need for a separate gauge tool or device.

We use the term "unthreaded mechanical connection" in reference to a mechanical connection between a conduit and another component using a single action movement that completes conduit retention with the component without using a second action, for example, a threaded engagement. In other words, a traditional tube fitting that is not a push to connect fitting typically involves a first action of inserting the conduit into the fitting assembly with the fitting in a finger tight position, and then a second action of tightening the threaded nut and body together using torque applied to the threaded connection to complete the pulled up assembly. The term "unthreaded mechanical connection" is not intended to exclude additional optional structure associated with the mechanical connection that may be threaded, but rather contemplates any mechanical connection for a conduit that does not require a threaded connection to effect the retention of the conduit with the connected component. We use the term "single action" to refer to a mechanical connection that is made with a single movement, for example an axial insertion. Another example of a single action connection or fitting is a push to connect assembly by inserting a conduit axially into another component. As used herein, the term "single action" is intended to include manual assembly as well as assembly with a tool.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

With reference to FIGS. 1-4 and initially FIG. 1, a first embodiment of one or more of the inventions is presented. In this example, a conduit fitting assembly 10 for tube or pipe conduit C may include a conduit receiving component 12. We also refer to the conduit receiving component 12 as a body wherein the body 12 receives a conduit end portion C1. Although we use the common term of body as a convenience, those skilled in the art will appreciate that the inventions are not limited to applications wherein such terminology may be used to describe the part. The body 12 may be a stand-alone component as illustrated or may be integral with or integrated or assembled into another component or assembly such as, for example, a valve, a tank or other flow device or fluid containment device. The body 12 may have many different configurations, for example, a union, a tee, an elbow and so on to name a few that are well known in the art. The body 12 herein is also commonly known in the art as a port body or female port because its entire structure can be although need not be recessed in or formed in another structure (for example, a valve body or a cylinder), and a mechanical connection for a conduit end can still be made therewith.

The fitting embodiments herein will find particular application in the automotive industry, however, they may be used anywhere there is a need for fluid pressure containment. As an example, the inventions herein may be used to realize an automotive fitting for containing rated gas pressures (for example, for methane) of about 3000 to about 3500 psi with rated performance as high as 5000 psi or greater. The fittings herein may be scaled to fra accommodate conduits such as nominal outside diameters of ⅛ inch or less up to and greater than ½ inch, for example. These values are only intended to be exemplary and not any limitation on the use or scope of the inventions disclosed herein. For automotive applications and others, the ported body 12 may comprise aluminum alloy, for example, but other metals may also be used as needed for particular applications, such as machined or forged stainless steel. The conduits herein may be made of stainless steel, such as 316 stainless steel, or other suitable metal for particular applications.

As noted, the body 12 is commonly understood as being a fitting component that receives an end C1 of a conduit C. FIGS. 1-4 furthermore illustrate an exemplary embodiment of an unthreaded mechanical connection for a conduit that embodies a single action or push to connect conduit fitting.

Figure 2:
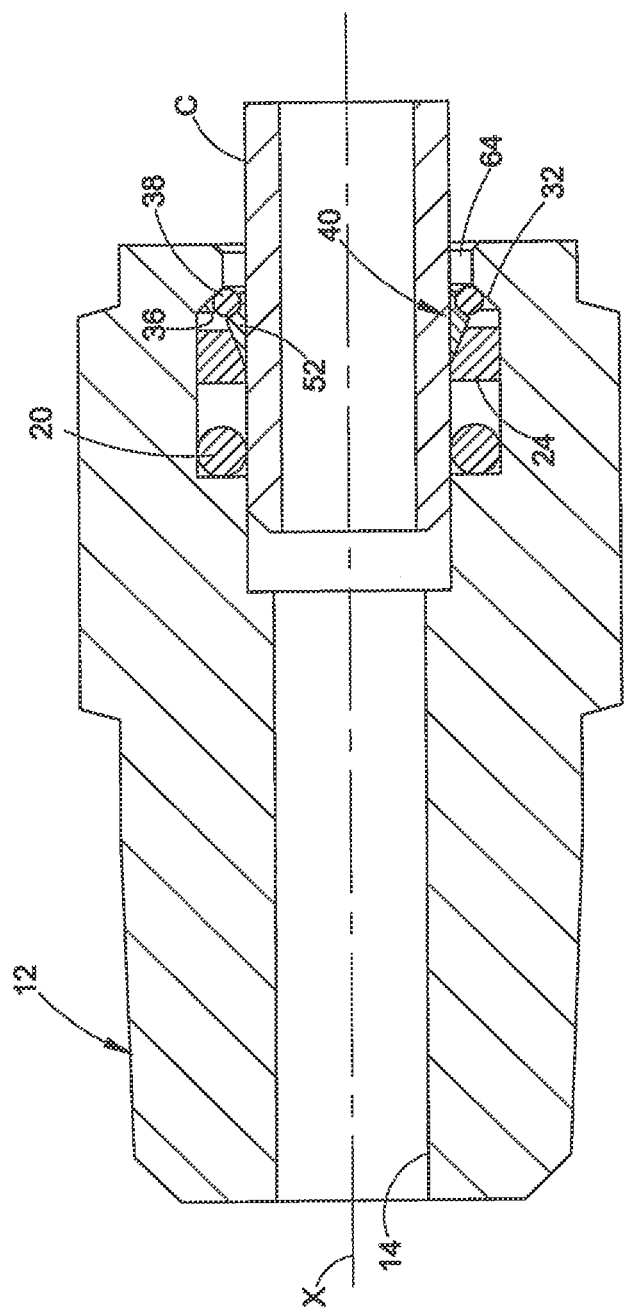
FIG. 2 is the assembly of FIG. 1 with a conduit captured in the assembly.

The terms "complete connection" or "complete assembly" or "final assembly" and derivatives thereof as used herein refer to joining the fitting components together to create a fluid tight seal and grip of the fitting assembly 10 with the conduit C. A pre-assembly or pre-assembled position as used herein is one in which the fitting components may be loosely or snugly assembled before conduit insertion and such that a conduit end can be inserted into the loose assembly and retained therein to form a completed connection. This pre-assembled position is exemplified in FIG. 1. We also refer to an initial or first connection or make-up to refer to the first time that a fitting is assembled to a complete assembled position such as illustrated in FIG. 2. A subsequent complete assembly or remake refers to any completed assembly after a previous completed assembly was disassembled by conduit removal, whether that previous completed assembly was the initial completed assembly or a later completed assembly or remake of the fitting.

We also refer to the term "loosely assembled" and derivative forms to refer to an assembly of parts that are held together but have not been fully assembled together to a position that effects conduit grip and seal and retention.

The various embodiments herein share a number of significant features that individually and in various combinations or collectively provide a robust mechanical connection to a conduit end. The embodiments herein are directed preferably to rigid conduits, such as metal tubing and pipe, as distinguished from flexible hose for example often with a non-metal conduit wall such as rubber or plastic. By rigid we mean that the conduit provides a sufficiently strong wall structure that allows a conduit gripping device such as, for example, a ferrule or ferrule-like device, to grip and optionally seal against an outer surface of the conduit, usually with a plastic deformation of a portion of the conduit and the gripping device. We do not use the word rigid to imply that the conduit cannot be bent or shaped as needed for a particular application. The term conduit is used in its broadest sense to include a metal stub, jacket, casing or sleeve and the like, and that may be used in an end fitting for a flexible non-metal hose.

A particular feature of interest is that the inventions provide an unthreaded mechanical connection to be made to a conduit end that does not need to be machined, formed or shaped other than the well known low cost processes of end facing and deburring. The conduit end does not need to be formed with recesses or external shapes. Thus, the inventions may be considered to provide a mechanical connection with a generally cylindrical or annular conduit shape having a smooth exterior surface such as tube or pipe, although shaped conduits may be used if needed for particular applications.

The body 12 may include a fluid bore 14 for fluid communication with the conduit C, or may simply be a blind port or cap. The body 12 includes a first counterbore 16 that provides a shoulder or other surface against which the conduit end wall C2 may bottom. However, it will be noted from the various embodiments herein that the fitting 10 does not require that the conduit C bottom against the shoulder 16 even when the fitting is in a completely assembled position (FIG. 2). As will be explained further hereinbelow, other exemplary techniques and structure may optionally be provided to indicate and verify sufficient conduit insertion into the body 12 for a completed assembly. In customary conduit fittings, it is usually desirable to have the conduit bottom against this shoulder 16, however, in the embodiments herein such bottoming may be less than complete because the conduit is provided with separate means for verifying that the conduit is fully inserted and bottoming is not needed for effecting an adequate fluid-tight seal. Therefore, the shoulder 16 is not a necessary feature of the body 12.

A second counterbore 18 is provided that has a somewhat larger diameter than the first counterbore 16. A first seal element or member 20 may be disposed in the recess of the second counterbore 18. The first seal element 20 may be realized in many different forms and shapes, and in the exemplary embodiment is preferably but not necessarily realized in the form of an o-ring. The first seal element 20 may be made of any material that is compatible with the system fluid contained by the fitting 10. For many gasses and liquids we use a fluorocarbon elastomer but many other materials are available including plastics, polymers and soft metal seals. When the conduit end C1 is sufficiently inserted so as to extend into the first counterbore 16, as shown for example in FIG. 2, the o-ring 20 is radially compressed between an outer surface C3 of the conduit and the cylindrical wall 22 of the second counterbore 18 to provide a fluid-tight seal between the conduit end portion C1 and the body 12 (note in the various figures herein that interference between two surfaces may be represented by overlap of the parts rather than showing the compression that actually occurs).

The conduit end face C2 may be provided with an optional chamfer C4, for example, a forty-five degree chamfer may be used as well as other angles. The chamfer C4 facilitates inserting the metal conduit end into the body 12 and past the o-ring seal 20 so as not to nick or otherwise damage the softer seal.

A second and optional seal or backing ring 24 may be provided just outboard of the first seal element 20. The first and second seal elements 20, 24 may be considered to form a seal mechanism although in many applications a single seal element may be used and in others perhaps additional seal elements may be used (see FIGS. 13 and 14 for example). In this embodiment, we use the second seal element 24 to diminish extrusion of the first seal element 20, particularly when the fitting 10 is under system fluid pressure. We therefore select the second seal 24 material to be somewhat stiffer than the first seal 20, for example PEEK™, PTFE, PFA and Nylon™, but again many other materials are available and well known and others may be later developed. The backing ring 24 may be a generally annular part with a generally cylindrical outer wall 26 and an inner diameter wall 28. In this embodiment, the inner wall 28 includes a first portion 28a that is generally cylindrical and closely received around the conduit outer surface C3, and a tapered portion 28b that will be further described below. When the conduit end C1 has been inserted to the fully assembled position as shown in FIG. 2, the first portion 28a of the inner diameter wall 28 contacts the conduit wall so that the backing ring 24 may be radially outwardly forced into compressive contact with the second counterbore wall 22. This compression provides excellent resistance to extrusion of the first seal 20 when the first seal 20 is exposed to system pressure. Note that the backing ring 24 may be split as along kerf cut 30 to facilitate assembly of the rather stiff backing ring 24 into the body and radial expansion outward when the conduit C is inserted. The radial compression of the second seal element 24 may also allow the second seal element 24 to provide a backup or secondary seal against fluid pressure should the first seal 20 allow fluid to bypass, particularly between the wall 22 and the first seal 20.

The body 12 may further include a reverse undercut in the form of an undercut 32, for example a tapered surface or wall 32, that may be formed between the second counterbore wall 22 and an outboard cylindrical wall 34 of the body 12. We have found that a taper angle of about forty-five degrees works well but other angles may be used as needed. For example, we have found angles in the range of approximately 30° to approximately 45° work well. The undercut 32 provides a tapered socket 36 that receives a conduit retaining member or ring 38. The conduit retaining ring 38 may be dimensioned to be at least partially received in or sit in the socket 36. The conduit retaining ring 38 may be realized in many different forms including but not limited to a split ring, snap ring, scarf cut wire, single piece wire coil or other radially expandable annular member, set of arcuate wire sections, balls or gripper elements optionally attached to each other and so on. The conduit retaining ring 38 preferably is radially expandable so that the retaining ring 38 may be displaced into an expanded space or volume such as a recess, for example a tapered groove, during disassembly. The retaining ring 38 preferably is also rigid or strong enough to be compressed about a surface, for example a surface of a ferrule or nut, to help retain the conduit against pressure blow-out, as described in greater detail below.

The conduit retaining ring 38, in some embodiments, preferably may have an inside diameter that is sized to be rather closely received over a conduit gripping device 40 which will be further described hereinbelow. In other embodiments, the retaining ring 38 may be sized so as to engage with a nut or other member of the fitting assembly. The retaining ring 38 is referred to herein also as a conduit retaining ring but this reference does not require direct contact between the retaining ring 38 and the conduit, but rather a feature of the retaining ring is to provide part of a structure that retains the fully inserted conduit in place under conditions described in more detail below. We also refer to the conduit retaining ring 38 as simply a retaining ring or member 38, or alternatively a conduit retainer or simply a retainer 38.

The conduit retaining ring 38 (also referred to herein as a retaining ring or retaining device or retainer) preferably also has an outside diameter that is sized to allow at least a portion of the retaining ring 38 to be radially expanded into the adjacent larger diameter portion of the second counterbore 18 provided by the cylindrical wall 22. When so expanded, the retaining ring 38 is disengaged from the conduit gripping device 40 (see FIG. 4). The smaller diameter or tapered socket 36 is dimensioned so as to engage the retaining ring 38 under certain conditions as further described below. The outboard cylindrical wall 34 forms a bore or annular space (64, see FIG. 2) to accommodate a disassembly tool described hereinbelow.

The conduit gripping device or member 40 preferably may be realized in the form of an annular body, for example, a ferrule or ferrule-like device that can be mechanically compressed, swaged or pre-swaged or otherwise attached onto the outer surface C3 of the conduit C. Preferably, the conduit gripping device 40 comprises a metal part, with the metal comprising stainless steel as one example. We use the terms "compressed", "swaged" and "pre-swaged" and derivatives thereof interchangeably herein to refer to conduit gripping device attachment to a conduit using axially and/or radially compressive loads. As such, the conduit gripping device 40 may be compressed so that at least a portion of the conduit gripping device inside diameter of the inner wall decreases in diameter and becomes smaller than the outside diameter of the conduit, thus forming an interference or friction fit. This interference or friction fit after the swaging or radial compression not only retains the conduit gripping device 40 on the conduit for subsequent make-up of the fitting, but also the conduit gripping device 40 will not freely rotate on the conduit. In other embodiments herein, a conduit gripping device 40 is combined with a load retaining sleeve that also produces this interference fit and also reduces or eliminates spring back of the conduit gripping device after the swaging step. The load retaining sleeve may also have an interference or friction fit with the conduit gripping device, and further these two parts may be pre-assembled as a cartridge or subassembly prior to being attached to the conduit.

Many different conduit gripping device designs may be used as needed, but we prefer, as one example, a ferrule having a forward edge 42 that will bite into or penetrate the outer surface of the conduit C. This biting or indentation action produces a shoulder 44 in the conduit surface that facilitates the ferrule to have a significant conduit grip when the fitting 10 is under system pressure. Preferably, the ferrule 40 will also exhibit a radially inward hinging action of a portion of the interior wall of the ferrule that causes the ferrule to collet or otherwise be radially compressed and swaged against the conduit outer wall. The hinging preferably produces a convex profile to a portion of the inner wall of the ferrule, as distinguished from the less preferred radially outward bowing action of some ferrule designs. This action provides a colleting region 46 of strong swaging or compression of the ferrule against the conduit surface so as to isolate the bite region 44 and accompanying stress riser near the front of the ferrule 40 from conduit vibration, shock and other stresses. The features of a hinging and colleting ferrule are fully described in U.S. Pat. Nos. 6,629,708; 7,100,949; 7,240,929; 7,367,595; 7,614,668; 7,699,358 and 7,762,595, the entire disclosures of which are fully incorporated herein by reference.

Although we prefer that the ferrule 40 exhibit the desired hinging and colleting effect to provide excellent conduit grip and optional seal under pressure, such a ferrule may not be needed in all applications. A benefit of using a ferrule that strongly grips and optionally seals against the conduit C is that the ferrule may provide a good back up seal to the o-ring seal along the conduit surface C3. The colleting or swaging action provides excellent isolation of the bite region 44 from conduit vibration and shock which may commonly occur in some applications such as automotive.

The ferrule 40 may also provide a means or mechanism by which the conduit C is captured and retained in the body 12. The ferrule 40 may be provided with an outer tapered surface or wall 48 and rearward extending flange 50 that provide a ferrule outer socket, notch or recess 52 that receives the retaining ring 38 when the conduit C has been inserted into the body 12. In other alternatives, the ferrule tapered wall 48 may be contoured rather than just being tapered or conical, for example, the ferrule tapered wall 48 may be contoured such as with a convex surface, a concave surface or other shape as needed.

Many different techniques may be used to attach the ferrule 40 to the conduit C. In a preferred method, a swaging tool may be used. Swaging tools are commonly used in the art to install one or more ferrules on a conduit end before assembly of a fitting. This is particularly common with larger ferrules and conduit outside diameters. With the present inventions, however, we use swaging of the ferrule so as to provide excellent conduit grip or retention on the conduit C, and may also provide vibration resistance or isolation from the bite, while at the same time providing a device that cooperates with the retaining ring 38 to securely hold the conduit C in the body 12. A suitable swaging tool is model AHSU, a pneumatic driven hydraulic swaging unit available from Swagelok Company, Solon, Ohio. However, other apparatus and methods may be used as needed to attach the ferrule 40 to the conduit C. By swaging the ferrule 40 onto the conduit prior to conduit insertion, a simple single action push to connect fitting is provided for rigid conduits which does not require any additional torque or tightening action of the fitting as is used in traditional flareless tube fittings. Rather, fitting assembly is completed by simply inserting the conduit end C1 into the body 12 until the retaining ring 38 snaps over the ferrule 40 and settles into the ferrule outer socket 52. Thus fitting assembly is completed by a single motion of insertion in a single direction and for many designs may be but need not be accomplished by hand. In some embodiments, the single motion may be accomplished with a tool such as a piston.

FIG. 1 illustrates the conduit fitting assembly 10 in a loosely assembled position preparatory to inserting the conduit end C1. The first and second seal elements 20, 24 may be first inserted into the body 12 along with the retaining ring 38. The ferrule 40 is swaged onto the conduit C prior to the conduit being inserted for complete assembly.

In FIG. 2 the conduit C has been axially pushed into the assembly 10 until the retaining ring 38 spreads outward and over the ferrule 40, particularly the tapered surface 48 of the ferrule, and snaps into the ferrule recess 52. This may be accompanied by an audible click or tactile sensation of resistance to further insertion of the conduit C as an intrinsic gauge so that the assembler knows that the conduit has been properly inserted to this position. The radially enlarged recess portion 36 of the body 12 accommodates radial expansion of the retaining ring 38 as it slides over the ferrule 40. The conduit may be pushed in with the retaining ring 38 sliding along the tapered outer surface 52 of the ferrule 40 until the retaining ring 38 axially aligns with the ferrule recess 52, at which point the retaining ring snaps into position as shown in FIG. 2. Note that in the position of FIG. 2 the seal mechanism 20, 24 is fully compressed into sealing engagement with the body wall 22 and the conduit outer surface C3.

Also note in FIG. 2 that when the conduit C has been fully inserted, a forward portion of the ferrule 40, and notably the front edge 42 and bite region 44, and optionally a portion of the ferrule outer recess 52, may be compressed between the backing ring 24 and the conduit C. Thus the backing ring 24 may be used to help maintain a strong collet and swage compressive force, and thus strong conduit grip, by the ferrule 40. This may be further facilitated by providing the tapered portion 28b of the retaining ring 24 at a suitable angle to help further compress the ferrule 40 against the conduit.

After the conduit C has been inserted into the body 12 as in FIG. 2, the conduit end is captured by the retaining ring 38 because the retaining ring 38 is captured between the tapered surface 32 and the ferrule outer recess 52, such that the retaining ring 38 interferes with the ferrule tapered back wall 48 should an attempt be made to axially withdraw the conduit. At this point and for this embodiment, as an example, the conduit C can only be removed from the nut 14 by use of a tool (described hereinbelow). Although we illustrate a particular shape for the ferrule 40 to operate with the retaining ring 38, this is but one example. The ferrule 40 and retaining ring 38 may be designed with many different shapes to facilitate their interaction to retain the conduit C in the body 12 to form a completed connection.

Figure 3:
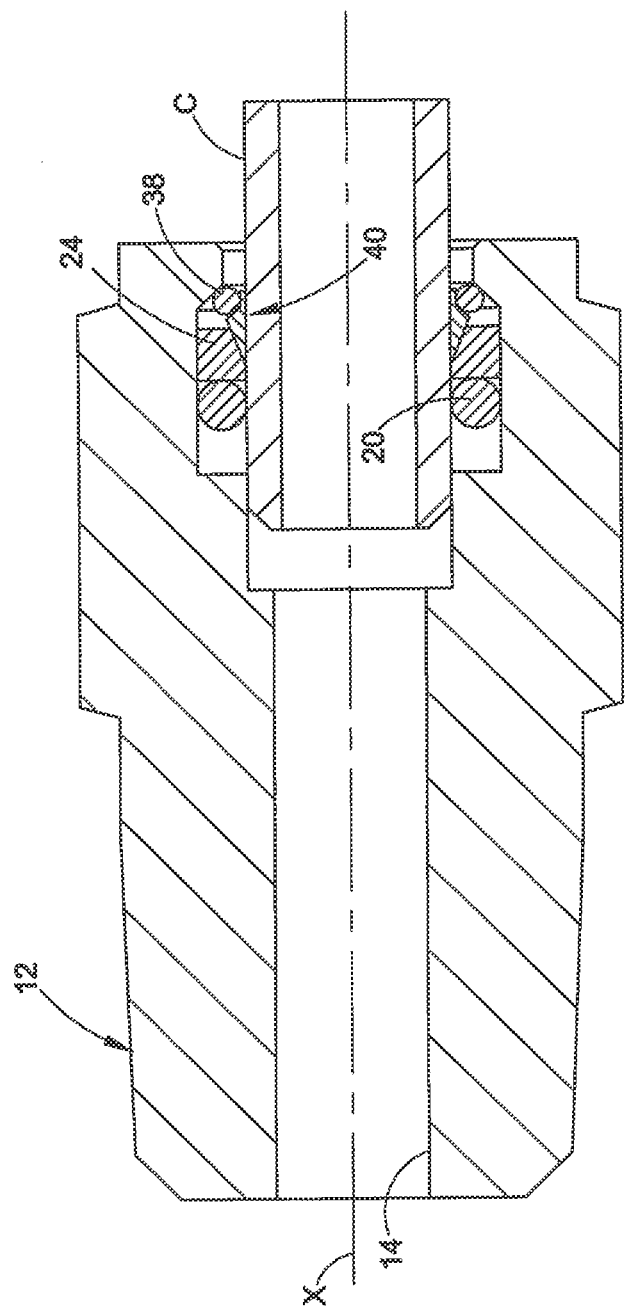
FIG. 3 is the assembly of FIG. 2 under system pressure.

FIG. 3 illustrates the conduit fitting assembly 10 under system pressure, whereas FIG. 2 illustrates the fitting assembly at no pressure or very low pressure. Under pressure as in FIG. 3, the first seal 20 tends to be pushed axially outboard on the conduit outer surface against the backing ring 24. This action will tend to increase the colleting or compression of the backing ring 24 against the tapered outer surface 52 of the ferrule, thus further increasing the grip and optional seal functions of the ferrule 40 against the conduit C. Also note that under pressure the conduit C will also tend to be forced axially away from the shoulder 16, but this action will cause further axial and radial compression of the retaining ring 38 between the tapered surface 32 and the tapered wall 48 of the ferrule 40, which may also further increase the colleting and swaging of the ferrule 40 against the conduit. The shape of the retaining ring 38 and the tapered wall 48 of the ferrule may be selected to enhance this result as needed. The ferrule 40 may be made of a suitable material including a material different from the material of the conduit, to exhibit good wear resistance when the fitting is under pressure and the ferrule 40 is in contact with the retaining ring 38. For example, the ferrule 40 may be case hardened or work hardened metal. Under system pressure, even if there are slight axial movements or substantial loads applied to the conduit and the seals 20, 24, the seal 20 maintains a fluid tight seal against the conduit and the body wall 22.

An assembler can verify that the conduit is properly inserted with different intrinsic gauge methods. One is the audible click when the retaining ring 38 snaps into position. The assembler will also note a significant resistance to further insertion of the conduit, as well as the inability to pull the conduit back out. Other visual markings or indications may be provided as needed to provide visual confirmation that the conduit is fully seated, such as, for example, a scribe mark on the conduit that becomes hidden by the end of the body 12 after the conduit is fully inserted. Many other intrinsic gauge techniques may be used and will be readily apparent to those skilled in the art.

Figure 4:
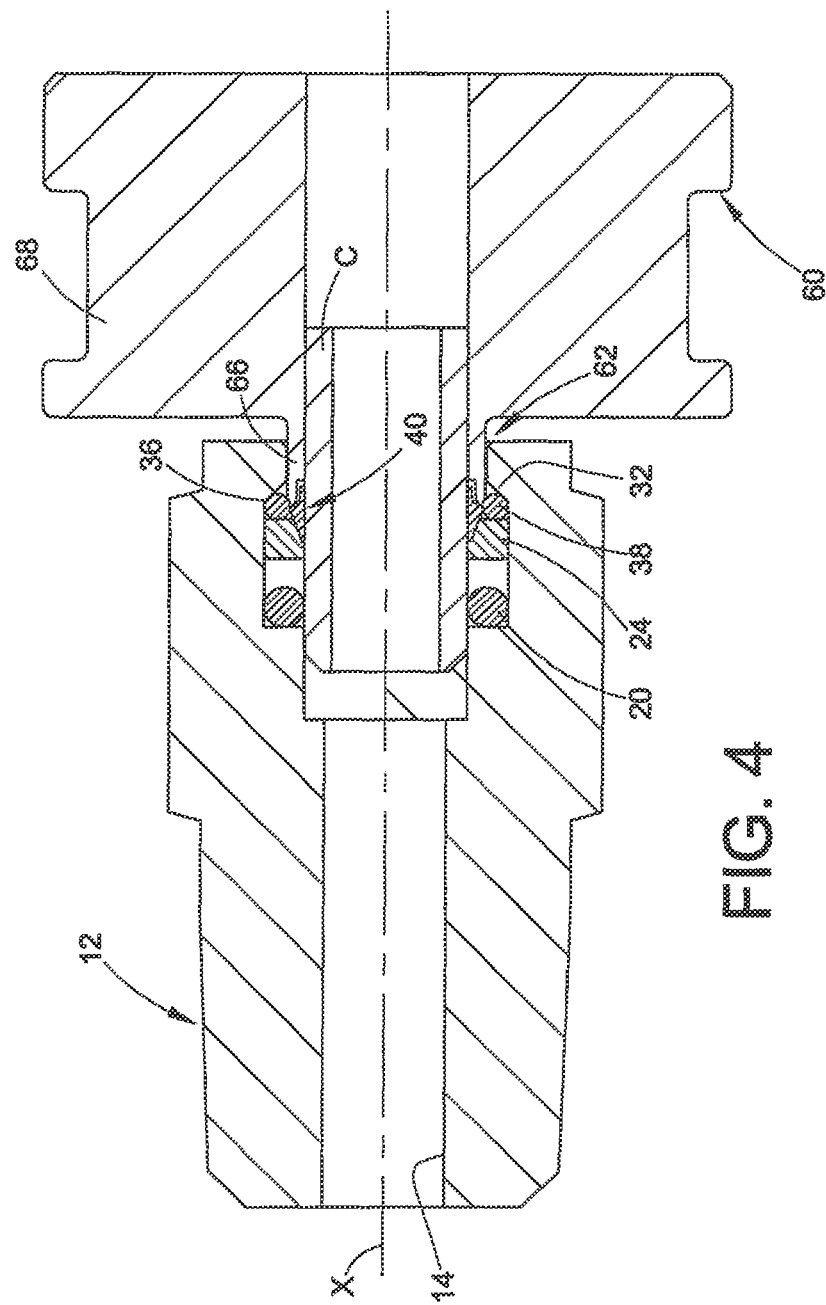
FIG. 4 is the assembly of FIG. 3 with a tool inserted to allow conduit removal.

Disassembly of the fitting 10 may be quickly and easily accomplished by use of a tool 60. With reference to FIG. 4, the tool 60 includes a retaining ring release portion or extension 62 which has been inserted through an annular space 64 (FIG. 2) between the conduit outer surface C3 and the outer body bore 34. The tool 60 may have any configuration that will allow insertion of the extension 62, such as for example a cylinder 66 or prongs or legs to extend into the fitting to engage the retaining ring 38. The tool extension 62 is inserted so as to expand the retaining ring 38 into the larger bore formed by the cylindrical wall 22 so that the retaining ring 38 has an expanded diameter that is large enough to allow the ferrule 40 to be axially withdrawn past the retaining ring. This allows the conduit C and the attached ferrule 40 to be withdrawn from the fitting assembly, preferably after system pressure has been released. The tool 60 may be made of any metal or non-metal material and simply needs to be stiff enough to spread the retaining ring 38 and prevent the retaining ring 38 from being pulled backward (outboard) when the conduit C and ferrule 40 are axially withdrawn from the fitting assembly 10. The tool may be split or scarf cut to allow wrap-around about the conduit C before insertion into the annular space 64. The tool 60 may include an enlarged gripping portion 68 to facilitate manual insertion into the fitting assembly 10.

In accordance with this and other embodiment of the inventions then, the benefits of an energized ferrule including conduit grip and optional seal under pressure and optional but preferred vibration isolation of the bite region from conduit stress and vibration are utilized to realize a high pressure single action push to connect fitting assembly.

Figure 5:
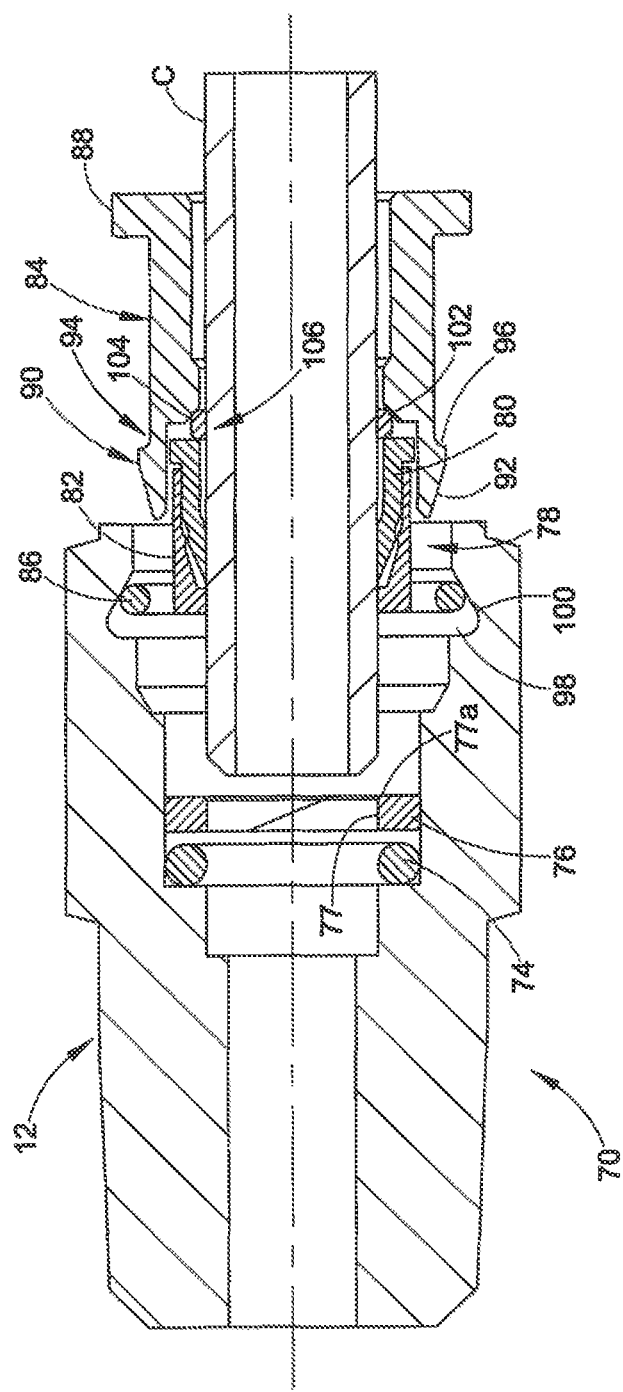
FIG. 5 is another embodiment of a push to connect fitting assembly shown in longitudinal cross-section and in a preassembled position.
Figure 6:
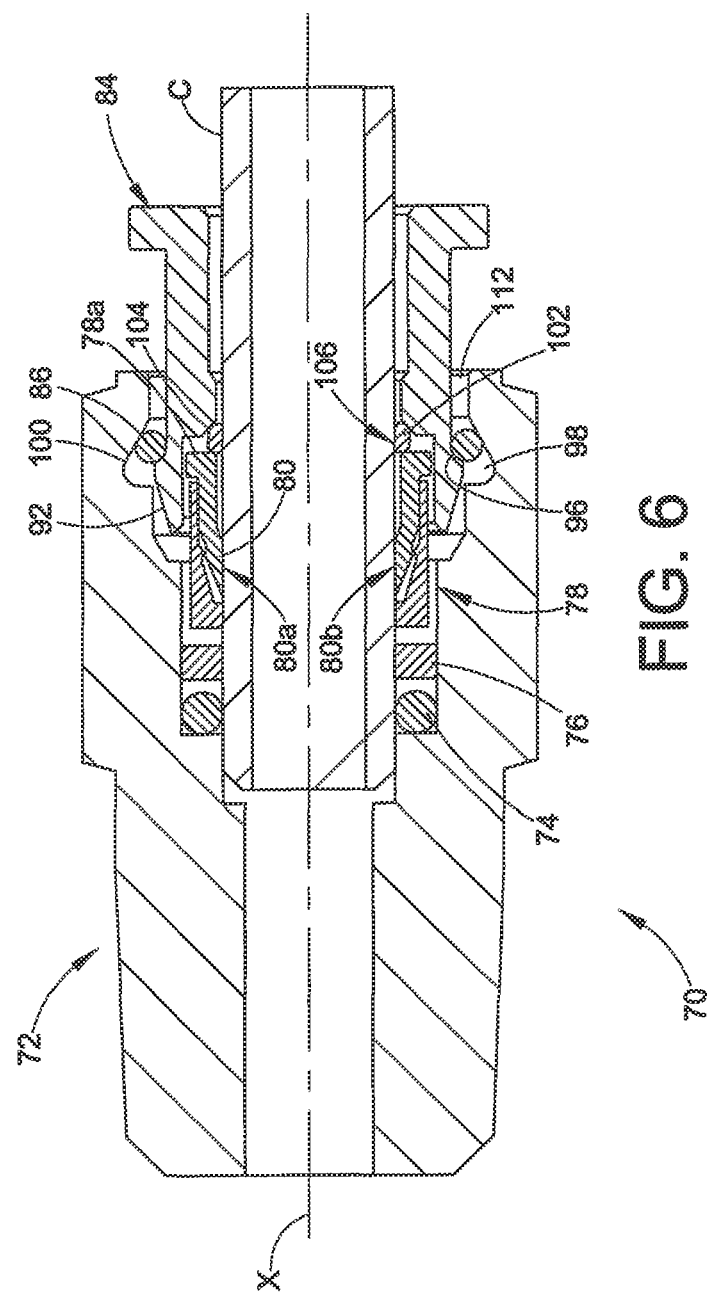
FIG. 6 is the assembly of FIG. 5 in a fully assembled position.
Figure 7:
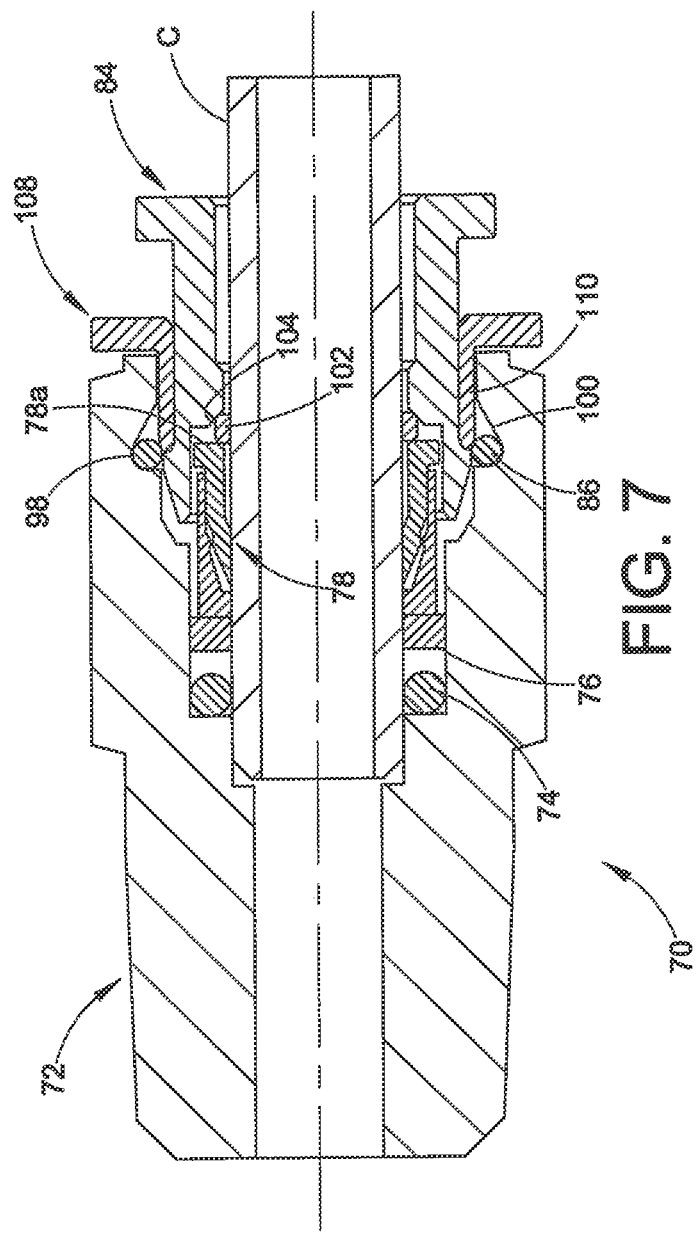
FIG. 7 is the assembly of FIG. 6 with a tool inserted to allow disassembly of the push to connect fitting.

FIG. 5-7 illustrate another embodiment of a fitting assembly 70. In this embodiment, a body 72, first seal 74 and second seal 76 may be used and may be the same as in the first embodiment of the parts 12, 20 and 24 of the first embodiment and therefore will not be described again. The seal members 74 and 76 are received in a bore 75. A ferrule assembly or set 78 is provided which is preferably swaged onto the conduit C prior to insertion of the conduit into the body 72 (FIG. 5 shows such a pre-swaged arrangement prior to complete insertion of the conduit into the body 12). The ferrule assembly 78 may include a conduit gripping and optional sealing ferrule 80, and a load retaining cap or sleeve 82. The ferrule 80 and the sleeve 82 may be a cartridge assembly meaning that these two components may be held together as a separate subassembly 78 prior to installing the ferrule assembly onto the conduit C. For example, the sleeve and ferrule may be secured together by a press fit, mechanical snap together, or an adhesive or other means as needed.

The exemplary ferrule 80 may include a tapered exterior surface 81 that cams against or otherwise engages a tapered interior surface 83 of the sleeve 82. When the ferrule 80 and load retaining sleeve 82 are axially forced together, the ferrule 80 is radially constrained and an interference or friction fit is produced to thereby hold the ferrule 80 and the sleeve 82 together as a pre-assembly or cartridge.

The ferrule assembly or cartridge 78 can be attached to the conduit by a swaging tool as noted hereinabove or by any other convenient means. For example, a radial compressive force may be applied about a portion or all of the ferrule assembly 78 to swage the ferrule assembly 78 onto the conduit. The load retaining sleeve 82 operates to prevent or substantially limit spring back of the swaged ferrule 80.

The swaging or radial compression results in the ferrule 80 having an inside diameter that is smaller than the unstressed outside diameter of the conduit, thus providing an interference fit style attachment of the ferrule on the conduit.

The ferrule set 78 may be attached to the conduit by a swaging tool as noted hereinabove or by any other convenient means. For a push to connect fitting, the sleeve 82 preferably remains with the ferrule 80 after swaging and may be used to reduce spring back of the ferrule 80, particularly the front portion 80a of the ferrule that bites into the conduit outer surface. In a traditional non-push to connect fitting, this spring back can occur for energized ferrules that have been pre-swaged onto a conduit after the swaging force is removed, prior to completing a pull-up of the fitting. But for this embodiment of our push to connect fitting, there is no need for a second ferrule or tapered surface to complete the connection as in a traditional fitting. Therefore, we use the load retaining sleeve 82 for our push to connect fitting to radially constrain the ferrule 80 and therefore maintain the pre-load applied to the ferrule 80 during swaging and prevent or reduce tendency for the ferrule to spring back. This may significantly improve the conduit grip and optional seal functions of the ferrule 80 by maintaining excellent bite and colleting for conduit grip under pressure and vibration isolation.

It will be noted that because this embodiment uses the load retaining sleeve 82, the second seal member 76 does not need to engage with the ferrule set 78, therefore the second seal may have a substantially cylindrical interior wall 77, with an optional chamfer 77a provided to prevent damage when the conduit C is passed therethrough.

A nut 84 may be provided which cooperates with a retaining ring 86 to secure and retain the conduit C in the body 72 after complete assembly. The nut 84 may be used conveniently to help insert the conduit into the body 72 and for this purpose may include a back flange or handle 88. The nut 84 also may include a forward nose 90 having a tapered outer surface 92 and a recess or groove 94 formed by a shoulder 96. The nut 84 may be unthreaded so as to be used to effect a single action push to connect operation.

The body 72 may include a tapered recess 98 that allows radial expansion of the retaining ring 86. With reference to FIG. 6, when the conduit C and nut 84 are inserted into the body 72, the retaining ring 86 radially expands into the larger diameter portion of the body tapered recess 98 as the ring 86 slides over the tapered surface 92 of the nut 84. Upon complete assembly, the retaining ring 86 moves or snaps into the nut groove 94, which is the position illustrated in FIG. 6. Note that the retaining ring 86 is axially captured between the nut groove 94 and the tapered surface or wall 100 of the body tapered recess 98. This interference prevents axial withdrawal of the conduit C from the body 72 without the use of a tool.

An optional bearing or gimbal 102 may be provided between the back end 78a of the ferrule set 78 and an inner shoulder 104 of the nut 84. This bearing 102 preferably is loosely installed on the conduit C. The bearing 102 may have any geometry that cooperates with the profile of the engaging surface 104 of the nut so as to allow radial pivot or flexing about the bearing 102, functionally somewhat in the nature of a universal joint. The bearing 102 may be used to bear the axial load of the conduit C and the ferrule 80 particularly when the fitting 70 is under system fluid pressure, in the nature of a thrust bearing. The bearing 102 may also provide a radial flexure or pivot region 106 for the conduit particularly when the conduit C is subjected to rotary or planar vibration or movement. This pivot region 106 thus may be axially spaced or positioned from the bite 80a and/or associated stress areas in the conduit produced by the swaged conduit gripping device to isolate the ferrule bite 80a and/or stress area from rotary flex, vibration or movement of the conduit as well as other fatigue inducing disturbances in the conduit, thus enhancing the vibration isolation effect of the colleting and swaging 80b by the ferrule 80. The bearing 102 preferably is designed with a small outer diameter and small surface area. The bearing 102 may be a separate discrete component as illustrated in FIGS. 5-7 or may be integrally formed as part of the ferrule 80 or the nut 84 (see FIG. 12 for example). It should be noted that the retaining ring 38 in the first embodiment may be designed to also provide this bearing effect by virtue of the direct contact between the back portion of the ferrule 40 and the tapered wall 32.

For disassembly, as illustrated in FIG. 7, a tool 108 may be used that includes a sleeve or extension 110. The sleeve 110 may be inserted through an annular space 112 (FIG. 6) between the nut 84 and the body 72. When the tool 108 is pushed in, the sleeve pushes the retaining ring 86 into the radially larger portion of the body tapered recess 98, thus allowing the nut 84 and conduit C to be axially withdrawn from the body 72.

We note at this point that a ferrule set such as for example used in the second embodiment may alternatively also be incorporated into the first embodiment. This would remove the use of the second seal or backing ring 24 from having to engage with the ferrule 40.

Figure 8:
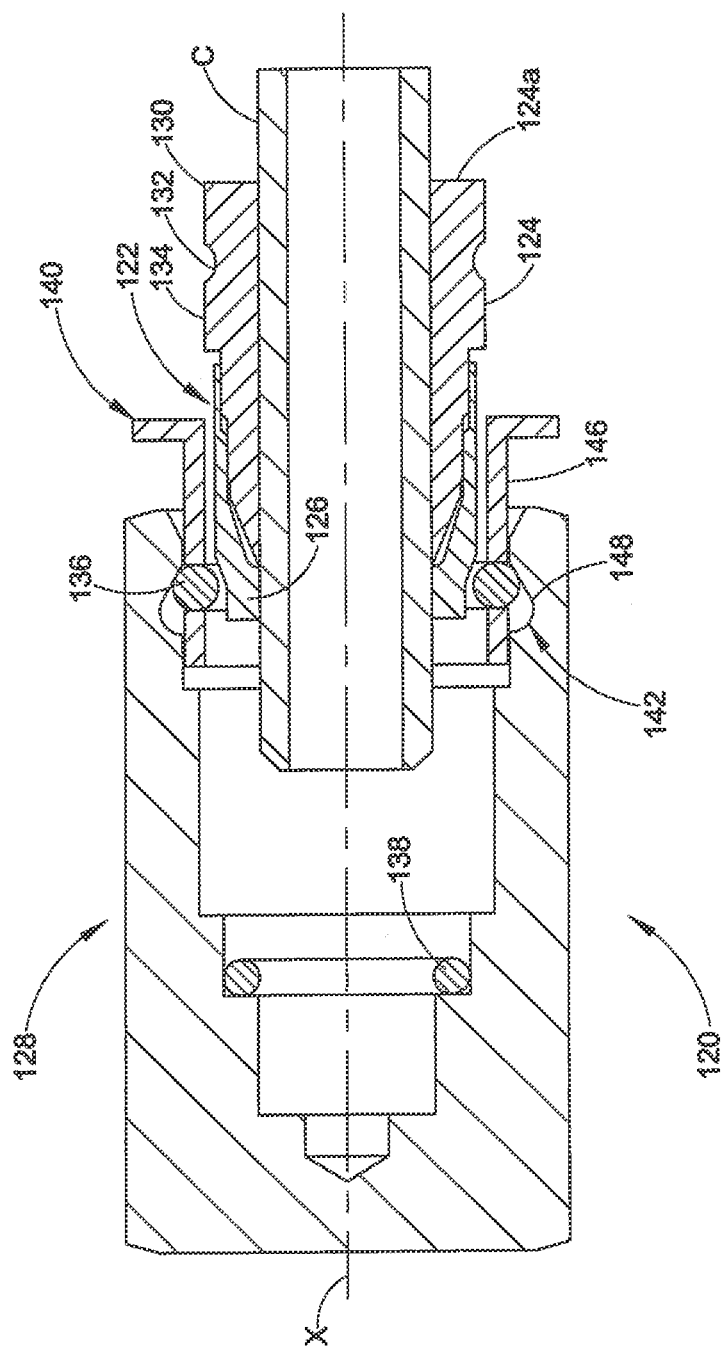
FIG. 8 is another embodiment of a push to connect fitting assembly shown in longitudinal cross-section and in a preassembled position.

FIG. 8 illustrates another embodiment of a push to connect conduit fitting assembly 120. In this embodiment, a ferrule set 122 is used as in the second embodiment, however, the ferrule set 122 is modified somewhat. The ferrule set 122 includes a ferrule 124 and a sleeve 126 which may be a cartridge type preassembly before being attached to the conduit C. The ferrule set 122 may then be swaged or otherwise attached to the conduit C prior to the conduit C being inserted into the body 128. It will be noted that this embodiment illustrates an example of a body that is in the form of a plug having a closed second end. The ferrule 124 includes a rearward flange portion 130 which has an annular groove or recess 132 formed in an outer surface 134 thereof. This recess 132 may be configured as needed to receive portions of the retaining ring 136 when the conduit C is inserted into the body 128. A first seal member 138 is provided as in the first two embodiments to provide a fluid tight seal between the body 128 and the conduit C. An optional anti-extrusion backing ring (not shown) may be used as needed, as in the first two embodiments. However, in the embodiment of FIGS. 8-11 we do not use a backing ring because the sleeve 126 may be dimensioned to provide a small gap with the body 128 so as to minimize the extrusion gap (see FIG. 10).

Figure 9:
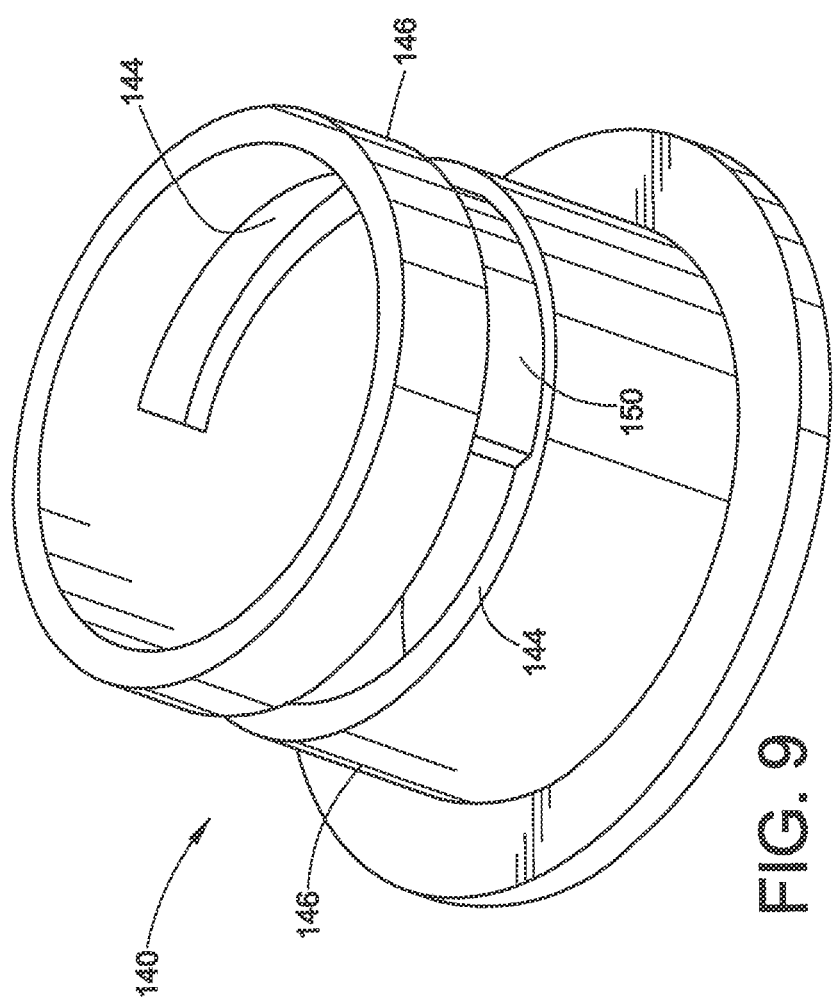
FIG. 9 is an embodiment of a positioning sleeve used in the fitting of FIG. 8.
Figure 10:
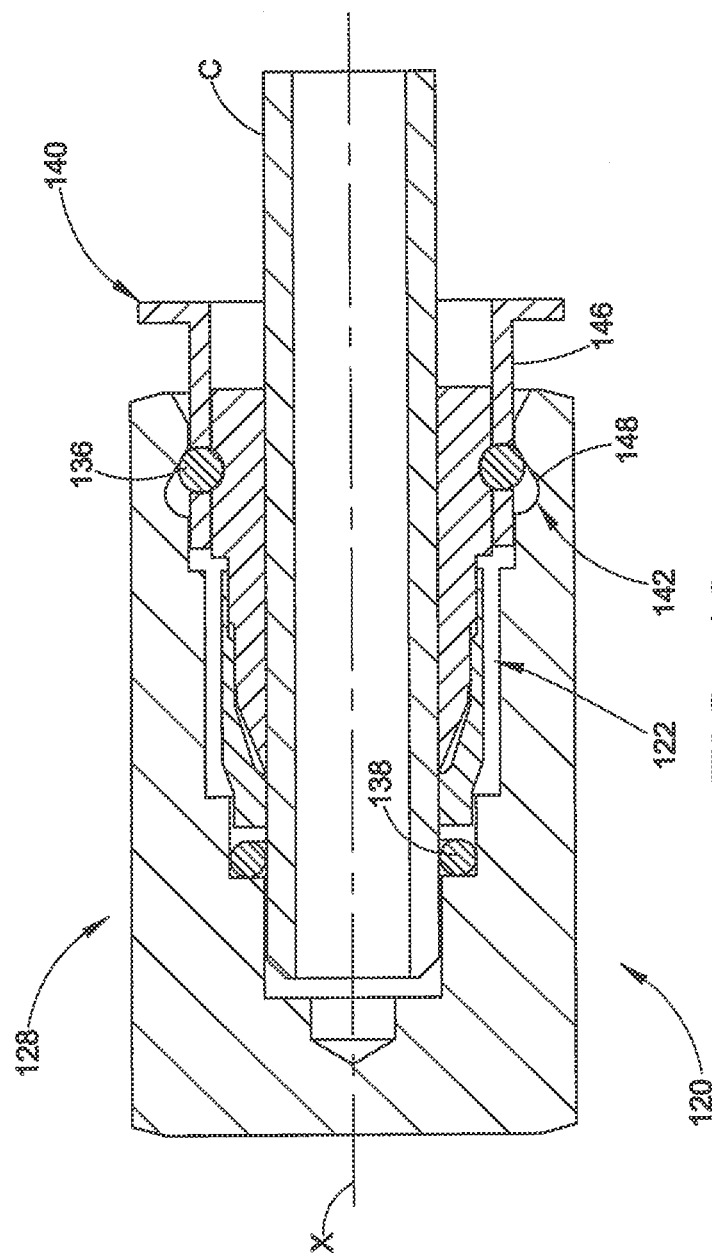
FIG. 10 is the assembly of FIG. 8 in a fully assembled position.

The retaining ring 136 in this example may be carried or integrated with an optional positioning sleeve 140. During assembly, the positioning sleeve 140 and retaining ring 136 may be seated in the body 128 so that the retaining ring 136 is axially aligned with a tapered recess 142 in the body. The retaining ring 136 and positioning sleeve 140 may also be realized as a subassembly prior to installation into the body. In alternative embodiments, the positioning sleeve may be a separate component that is used to move the retaining ring 136 into the tapered recess 142 during disassembly. As shown in FIG. 9, the positioning sleeve 140 may include one or more arcuate openings or slots 144 in the cylindrical wall 146 of the sleeve. These openings 144 receive the retaining ring 136 to hold the ring to the sleeve, while at the same time permitting the retaining ring 136 to be radially expanded during assembly and disassembly of the fitting 120. In the embodiment of FIG. 9, there are two openings 144 which may be diametrically opposed to each other. The greater the arcuate length, the more inside diameter surface area of the retaining ring 136 is available to engage the ferrule recess 132. In order for the retaining ring 136 to be received in the ferrule recess 132, the lands 150 between the arcuate openings 144 may have a minor outside diameter that is somewhat smaller than the major diameter of the cylindrical wall 146 of the sleeve. This allows corresponding arcuate portions of an inner surface area of the retaining ring 136 to be received in the ferrule recess 132, as best illustrated in FIG. 10. The entire outer diameter surface area of the retaining ring 132 is available to engage the tapered wall 148 body tapered recess 142. The retaining ring 132 may be a split ring to facilitate radial expansion into the tapered recess 142 as needed.

With reference to FIG. 10, in the fully assembled position the seal 138 is radially compressed between the body 128 and the outer surface of the cylindrical conduit C. The forward end of the ferrule sleeve 126 may help to restrain the seal 138 against extrusion under pressure or a backing ring may be used. As the conduit C is pushed into the body 128, the assembler may hear an audible click when the retaining ring 136 snaps into the ferrule recess 132. The ferrule 124 may also be designed, for example, with an axial length such that the back end 124a of the ferrule becomes flush with or recessed into the body, as illustrated in FIG. 10. This is another optional technique for intrinsic gauging that the fitting has been completely assembled. If the conduit C is pulled backward or forced backward under system pressure, the positioning sleeve 140 also moves back until the retaining ring 136 engages the tapered wall 148 of the body recess 142. This prevents the conduit C from being axially withdrawn from the body 128 without changing the position of the positioning sleeve 140.

Figure 11:
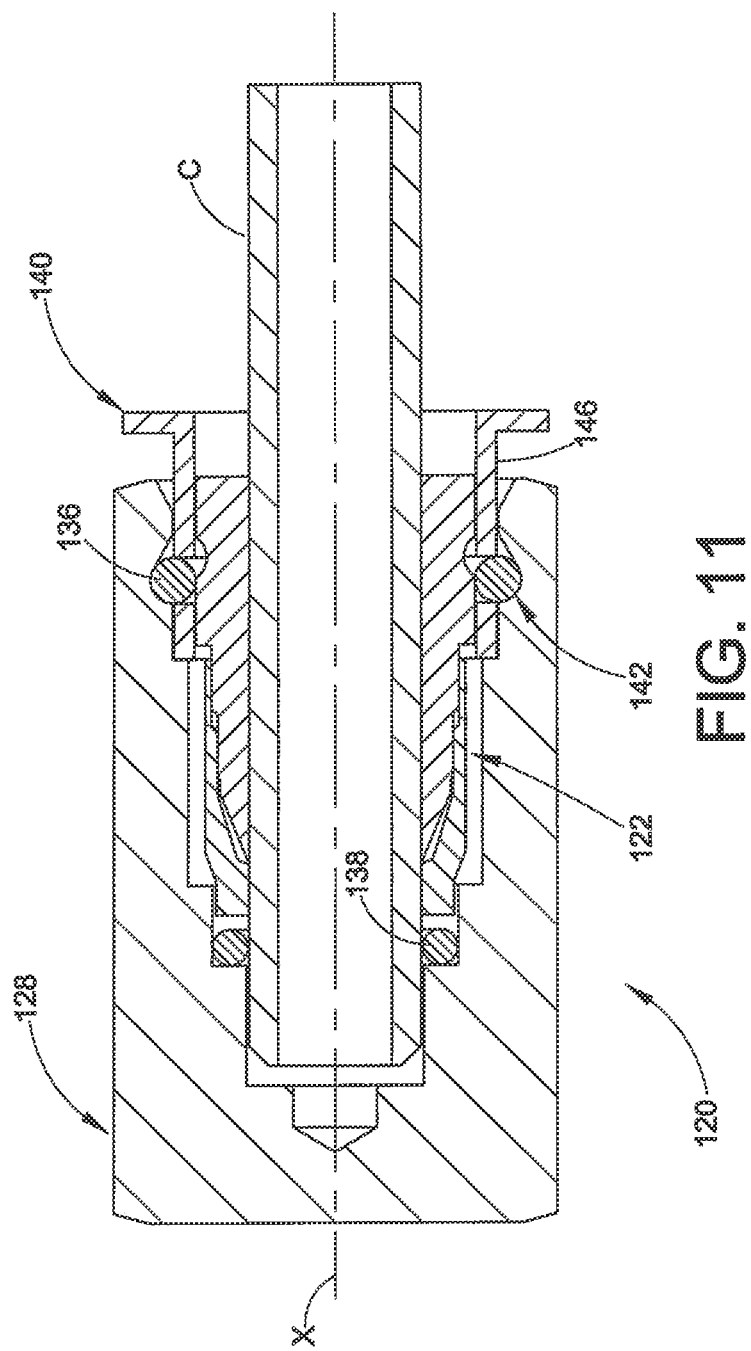
FIG. 11 is the assembly of FIG. 10 with a removal tool operated to a disassembly position.

For disassembly and as illustrated in FIG. 11, after system pressure is released the positioning sleeve 140 may be axially pushed forward until the retaining ring 136 is aligned with the radially enlarged portion of the tapered recess 142. This allows the retaining ring 136 to expand radially outwardly when the conduit C and the attached ferrule set 122 are axially withdrawn from the body 128.

We thus disclose and claim a fitting assembly for making a mechanical connection to a rigid cylindrical conduit by a single action push to connect method. This mechanical connection may include the use of a conduit gripping and seal device that hinges and collets onto the conduit, before the push to connect action, during a swaging or other compression operation to provide excellent conduit grip, optional seal, and vibration isolation. A primary seal may be provided by a soft seal such as an o-ring, with use of an optional backing ring or rings. In some embodiments, a bearing may be provided to further isolate conduit vibration and fatigue effects from the ferrule bite in the conduit. Also in some embodiments a sleeve may be used as part of a ferrule set or cartridge to retain swage pre-load on the ferrule after the swaging operation is completed. The push to connect action may be a single action in the sense that for the final complete connection step, a single direction of engagement to push the conduit into the fitting to achieve seal and retention may be used, and the push to connect action may in many cases be performed manually. Disassembly may be realized with the use of a tool that may be assembled with the fitting or separately used after fitting assembly.

Figure 12:
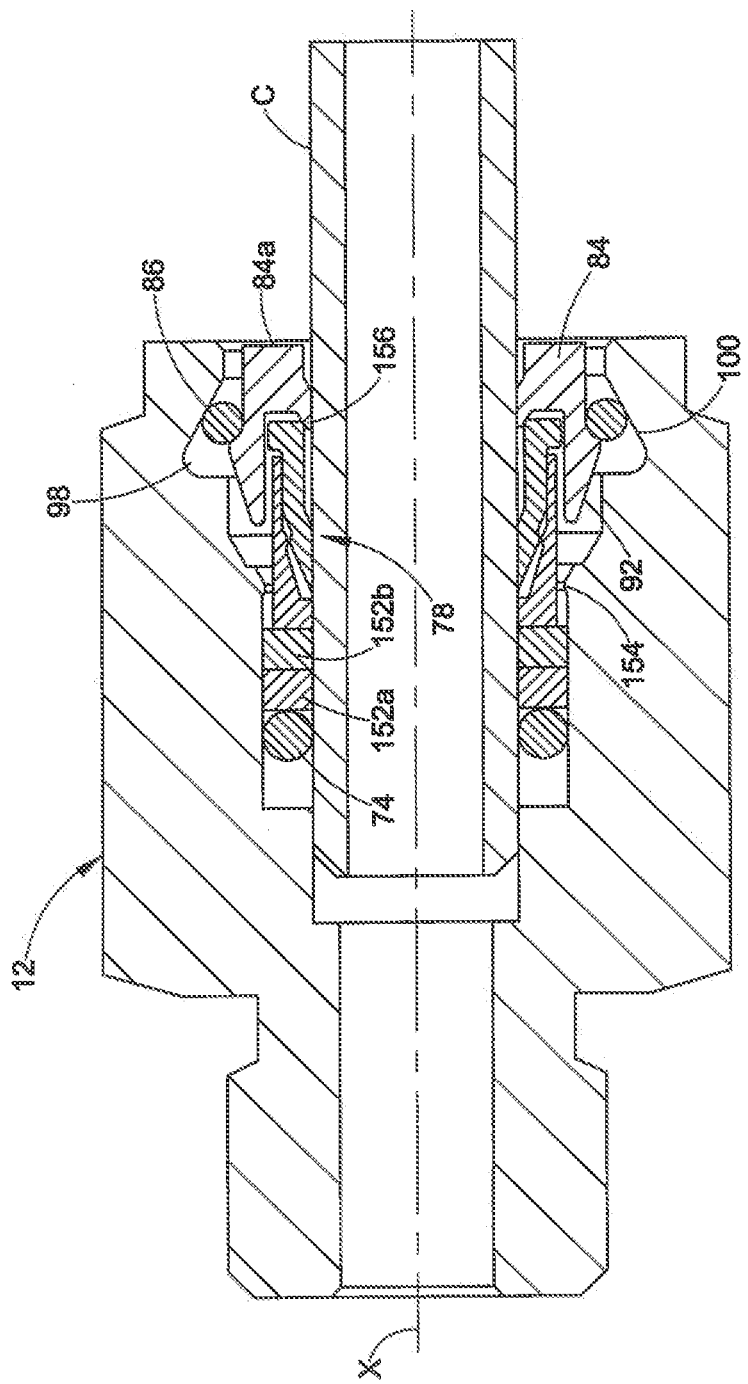
FIGS. 12 and 13 illustrate alternative embodiments of various features in the first three embodiments.
Figure 13:
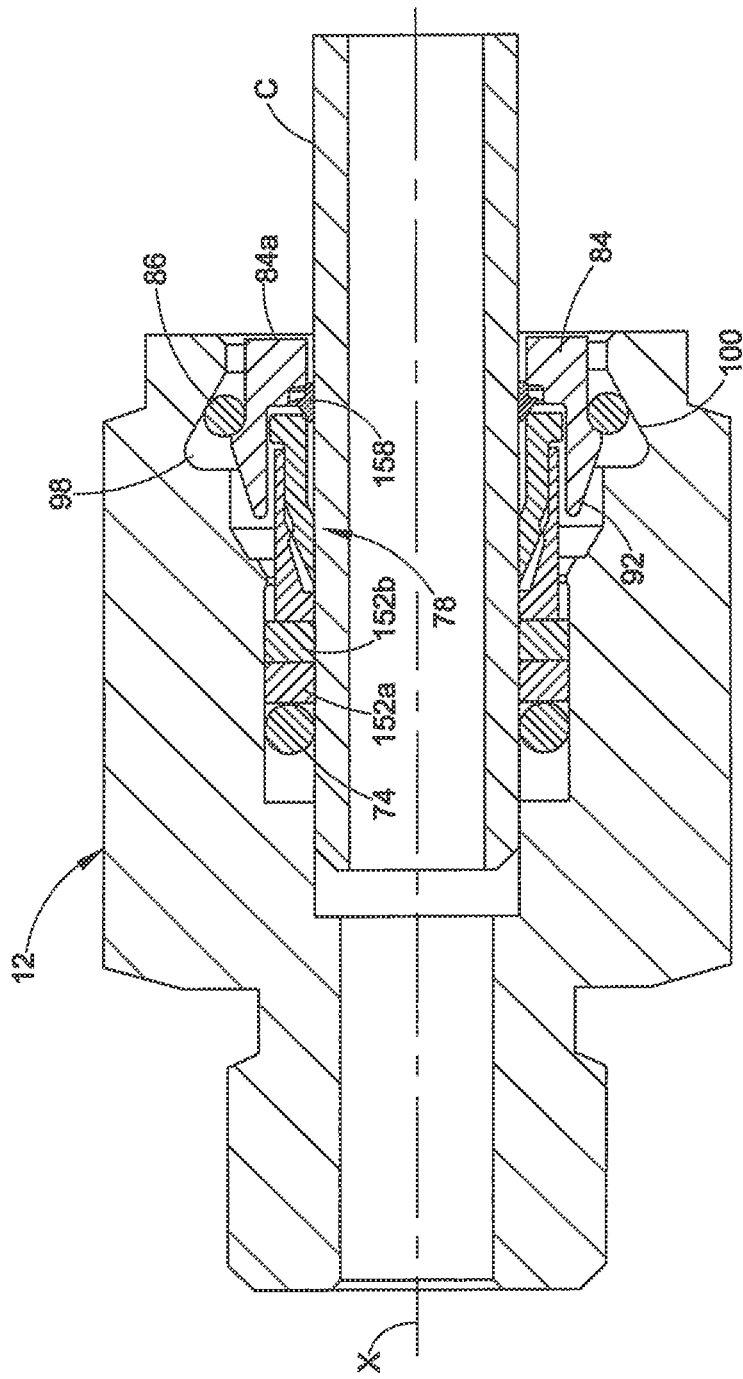

With reference to FIGS. 12 and 13 (and FIGS. 5-7) we illustrate alternative embodiments, some of which clearly apply to all the embodiments herein. In FIG. 12, for example, we start with the basic configuration of the embodiment of FIGS. 5-7 but also show the use of two backing rings 152a and 152b. The backing ring 152b that is furthest axially from the first seal 74 may be made of a somewhat harder material than the first backing ring 152a to provide further anti-extrusion resistance to the seal assembly which includes the first seal 74 and the two backing rings 152a and 152b. The use of extra backing rings or seal members may be provided in the other embodiments herein as well. Also provided is an inward constriction 154 formed in the bore 75. This constriction may be used to prevent the seal members 74, 152a and 152b from accidentally being withdrawn from the body 72 when the conduit C is axially withdrawn after a completed assembly. This constriction may be used in the other embodiments as well.

In FIG. 12 we also show the use of a gimbal or bearing 156 integrally formed with the nut 84, in lieu of the discrete bearing 102 (FIG. 5). The use of a machined gimbal or bearing eliminates a separate component of the fitting and may be shaped as needed to effect the bearing function. In this example, the integral bearing 156 is machined into the nut 84. Also note that the nut 84 back end has been axially truncated as compared to the embodiment of FIG. 5. When the nut 84 is fully inserted into the body for a completed assembly in which the retaining ring 86 snaps into the recess 94 (FIG. 5) of the nut, the back end 84a of the nut may be flush with or slightly recessed into the body 72 thus providing a visually perceptible intrinsic gauging feature to verify complete assembly.

The FIG. 13 embodiment may include the arrangement of FIG. 12 except that a ferrule like bearing member or gimbal 158 is used rather than the integral bearing 156. We have found that a ferrule like member such as used in the FIG. 1 embodiment also provides the desired gimbal or bearing function, and the shape of the ferrule may be controlled to produce the desired rotary flexing and vibration isolation effects.

Figure 14:
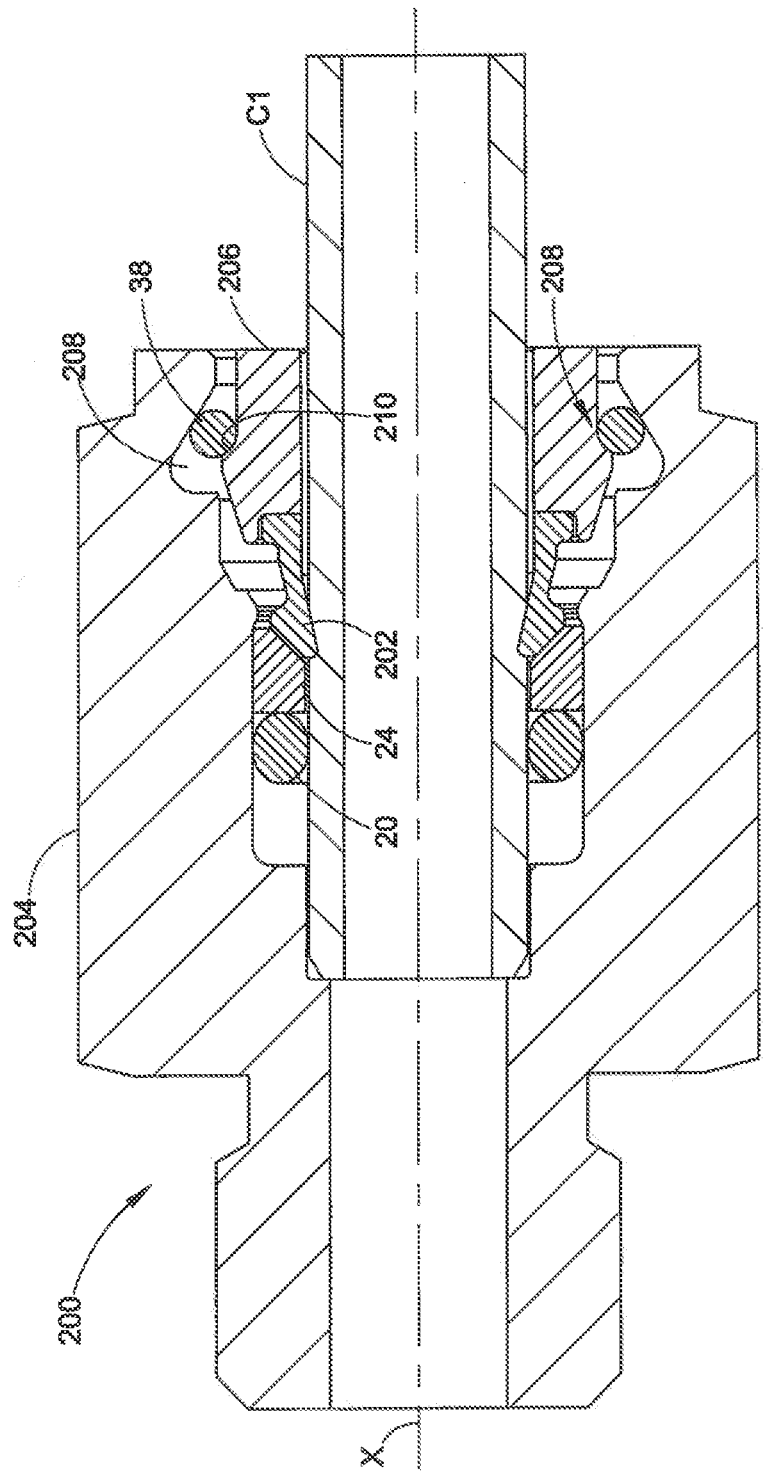
FIGS. 14 and 15 illustrate additional alternative embodiments, showing a single ferrule with a nut for conduit retention, in a fully assembled position.

With reference to FIG. 14, we illustrate another embodiment of a push to connect fitting 200 that provides a single action mechanical connection for a conduit end. This embodiment shares features of the first embodiment (FIGS. 1-4) and the embodiments of FIGS. 12 and 13, and therefore those descriptions need not be repeated in their entirety. In this embodiment, a single ferrule 202 is attached to the conduit end portion C1 such as by a swaging operation for example, prior to the conduit end C1 being inserted into the body 204. In contrast to the first embodiment of FIG. 1, however, a nut 206 cooperates with the retaining ring 38 to hold the fitting together and to retain the conduit end C1 with the body 204. The nut 206 may be but need not be similar to the nut 84 in the embodiment of FIG. 12, for example. Although not shown, the nut 206 may optionally include the integral gimbal 156 (FIG. 12). The push to connect fitting 200 may further include a seal mechanism such as a first seal 20 and backing ring 24 or an alternative seal mechanism may be used as needed. The body 204 may include a tapered recess 208 that cooperates with the retaining ring 38 in a manner as described with reference to FIG. 12.

The single action push to connect fitting 200 is assembled by slipping the nut 206 onto the conduit C1 behind the attached ferrule 202 and then axially inserting the conduit end C1 into the body 204 until the retaining ring 38 engages with a surface of a nut recess 208, such as a tapered surface 210. The retaining ring 38 is captured between the nut recess tapered surface 210 and a surface of the tapered recess 208 to prevent the conduit end from being axially separated from the body 204 until the retaining ring 38 is displaced into the enlarged volume of the tapered recess 208. The fitting thus provide an unthreaded mechanical connection between the conduit end and the body 204 using a single action push to connect method.

Figure 15:
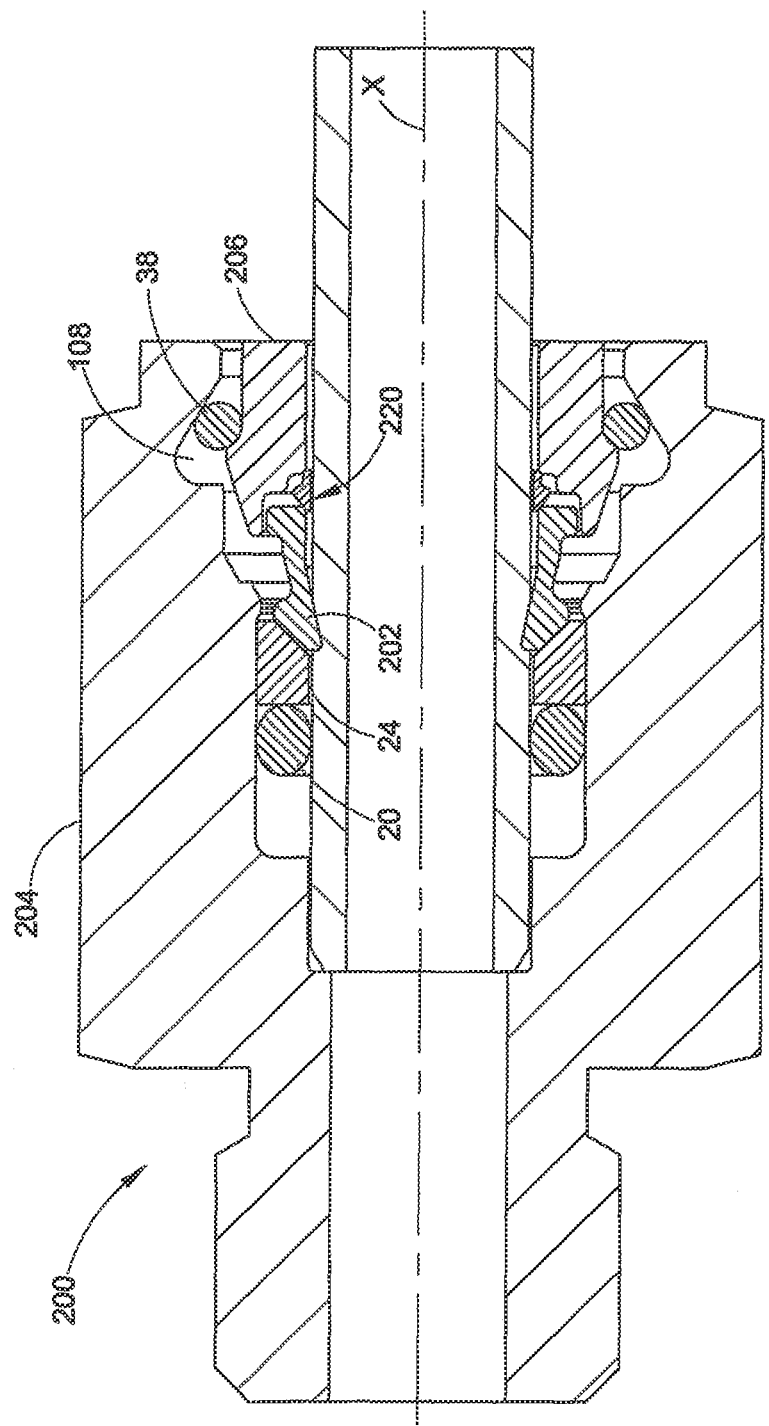

FIG. 15 illustrates another alternative embodiment that may be similar to the embodiment of FIG. 14 so that such description need not be repeated. The FIG. 15 embodiment differs from the FIG. 14 embodiment in that a ferrule like bearing or gimbal 220 may be optionally used. This aspect may be similar to the above description with respect to the bearing 158 of the FIG. 13 embodiment herein.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A push to connect fitting, comprising:
    a body member having an unthreaded first end,
    a conduit comprising a conduit first end that can be axially inserted into the unthreaded first end of said body member and a circumferentially continuous metal attached conduit gripping device pre-swaged into radial compression against a first substantially cylindrical exterior surface portion of said conduit, such that an inside diameter portion of said conduit gripping device is smaller than an outside diameter of an unvarying second substantially cylindrical exterior surface portion of said conduit adjacent to the first exterior surface portion to axially fix the attached conduit gripping device on the conduit, and
    a retainer that retains said conduit first end, with said attached conduit gripping device, in place within said body member when said conduit first end, with said attached conduit gripping device, is inserted into the unthreaded first end of said body member;
    wherein said retainer engages said conduit gripping device to prevent axial separation of said conduit from said body member when said conduit first end has been inserted into the unthreaded first end of said body member, said body member comprises a tapered groove into which said retainer can expand to allow axial separation of said conduit and said body member.

2. The push to connect fitting of claim 1 wherein said conduit comprises an annular cylindrical shape having a smooth exterior surface extending from said second exterior surface portion to said conduit first end.

3. The push to connect fitting of claim 1 wherein said conduit gripping device comprises a ferrule that is under radial compression against said first exterior surface portion of said conduit.

4. The push to connect fitting of claim 3 wherein said smaller inside diameter of said ferrule prevents said ferrule from freely rotating on said conduit exterior surface.

5. The push to connect fitting of claim 1 comprising a seal that seals against said conduit when said conduit first end is fully inserted into the unthreaded first end of said body member.

6. The push to connect fitting of claim 5 wherein when said conduit first end is fully inserted into the unthreaded first end of said body member an end face of said conduit first end engages an internal shoulder in said body member.

7. The push to connect fitting of claim 1 wherein when said conduit first end is fully inserted into the unthreaded first end of said body member an end face of said conduit first end engages an internal shoulder in said body member.

8. The push to connect fitting of claim 1 wherein said retainer prevents axial separation of said conduit from said body member after said conduit first end has been inserted into the unthreaded first end of said body member.

9. The push to connect fitting of claim 8 wherein said retainer comprises a radially expandable body.

10. The push to connect fitting of claim 9 wherein said radially expandable body comprises a metal ring.

11. The push to connect fitting of claim 8 wherein said retainer engages said conduit gripping device when said conduit first end has been fully inserted into the unthreaded first end of said body member.

12. The push to connect fitting of claim 1 comprising a tool that can be used to move said retainer into said tapered groove.

13. The push to connect fitting of claim 1 comprising a load retaining sleeve that maintains compressive load on said conduit gripping device after said conduit gripping device has been attached to said exterior surface portion of said conduit.

14. The push to connect fitting of claim 1 comprising a seal disposed in said body member and that seals against said conduit when said conduit first end has been fully inserted into the unthreaded first end of said body member.

15. The push to connect fitting of claim 14 wherein said seal comprises an o-ring.

16. The push to connect fitting of claim 15 comprising a backing ring for said seal.

17. The push to connect fitting of claim 1 comprising a gimbal that engages said conduit gripping device when said conduit first end has been fully inserted into the unthreaded first end of said body member, said gimbal providing radial flexure support of said conduit to reduce stress on said conduit gripping device attached to said conduit when said conduit is subjected to vibration or rotary force.

18. The push to connect fitting of claim 1 wherein said conduit comprises metal.

19. The push to connect fitting of claim 18 wherein said conduit comprises stainless steel and said conduit gripping device comprises stainless steel.

20. The push to connect fitting of claim 1 comprising an outer sleeve having an interference fit with said conduit gripping device so that said conduit gripping device cannot freely rotate about said conduit.

21. The push to connect fitting of claim 1 wherein said conduit gripping device comprises a ferrule.

22. A push to connect fitting, comprising:
a body member having an unthreaded first end,
a conduit comprising a conduit first end that can be axially inserted into the unthreaded first end of said body member and a circumferentially continuous metal attached conduit gripping device pre-swaged into radial compression against a first substantially cylindrical exterior surface portion of said conduit, such that an inside diameter portion of said conduit gripping device is smaller than an outside diameter of an unvarying second substantially cylindrical exterior surface portion of said conduit adjacent to the first exterior surface portion to axially fix the attached conduit gripping device on the conduit, and
a retainer that retains said conduit first end, with said attached conduit gripping device, in place within said body member when said conduit first end, with said attached conduit gripping device, is inserted into the unthreaded first end of said body member;
wherein said retainer prevents axial separation of said conduit from said body member after said conduit first end has been inserted into the unthreaded first end of said body member;
wherein said retainer engages said conduit gripping device when said conduit first end has been fully inserted into the unthreaded first end of said body member; and
wherein said body member comprises a tapered surface, said retainer being captured between a surface of said conduit gripping device and said tapered surface of said body member when said conduit first end has been fully inserted into the unthreaded first end of said body member.

23. The push to connect fitting of claim 22 wherein said retainer engages said conduit gripping device to prevent axial separation of said conduit from said body member when said conduit first end has been inserted into the unthreaded first end of said body member, said body member comprises a tapered groove into which said retainer can expand to allow axial separation of said conduit and said body member.

24. A push to connect fitting, comprising:
a body member having an unthreaded first end,
a conduit comprising a conduit first end that can be axially inserted into the unthreaded first end of said body member and a circumferentially continuous metal attached conduit gripping device pre-swaged into radial compression against a first substantially cylindrical exterior surface portion of said conduit, such that an inside diameter portion of said conduit gripping device is smaller than an outside diameter of an unvarying second substantially cylindrical exterior surface portion of said conduit adjacent to the first exterior surface portion to axially fix the attached conduit gripping device on the conduit,
a retainer that retains said conduit first end, with said attached conduit gripping device, in place within said body member when said conduit first end, with said attached conduit gripping device, is inserted into the unthreaded first end of said body member; and
a gimbal that engages and axially supports said conduit gripping device when said conduit first end has been fully inserted into the unthreaded first end of said body member.

25. The push to connect fitting of claim 24 wherein said gimbal reduces radial flexure effect on said conduit gripping device that propagates along said conduit from outside said push to connect fitting due to external vibration or rotary flexure of said conduit.

* * * * *